United States Patent
Zhang et al.

(10) Patent No.: US 10,285,199 B2
(45) Date of Patent: May 7, 2019

(54) METHOD, APPARATUS, DEVICE AND NETWORK SYSTEM FOR ADDING SECONDARY SERVING CELL

(71) Applicant: Huawei Technologies Co., Ltd., Shenzhen, Guangdong (CN)

(72) Inventors: Tao Zhang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/898,523

(22) Filed: Feb. 17, 2018

(65) Prior Publication Data
US 2018/0176950 A1    Jun. 21, 2018

Related U.S. Application Data

(63) Continuation of application No. 14/611,428, filed on Feb. 2, 2015, now Pat. No. 9,924,538, which is a
(Continued)

(51) Int. Cl.
*H04W 74/00* (2009.01)
*H04W 56/00* (2009.01)
(Continued)

(52) U.S. Cl.
CPC ..... *H04W 74/008* (2013.01); *H04W 56/0045* (2013.01); *H04W 74/002* (2013.01); *H04W 48/17* (2013.01); *H04W 74/0833* (2013.01)

(58) Field of Classification Search
CPC ............ H04W 74/002; H04W 74/008; H04W 74/0833; H04W 56/0045; H04W 48/17
See application file for complete search history.

(56) References Cited

U.S. PATENT DOCUMENTS

| | | |
|---|---|---|
| 2011/0249635 A1 | 10/2011 | Chen et al. |
| 2011/0269464 A1 | 11/2011 | Xu et al. |
| | (Continued) | |

FOREIGN PATENT DOCUMENTS

| | | |
|---|---|---|
| CN | 102014476 A | 4/2011 |
| CN | 102123516 A | 7/2011 |
| | (Continued) | |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 10)"; 3GPP TS 36.323 V10.1.0; Mar. 2011; 26 pages.

(Continued)

*Primary Examiner* — Paul H Masur

(57) ABSTRACT

The present invention provides a method for adding a secondary serving cell, an apparatus, a device, and a network system. The method includes: communicating, with each other to acquire a unified serial number of a random access preamble code, a unified serial number of a PRACH mask code, and a unified cell radio network temporary identifier of a terminal; scrambling the serial number of the random access preamble code and the serial number of the PRACH mask code, and then sending the serial number of the random access preamble code and the serial number of the PRACH mask code to the terminal; and determining, a time advance command TAC according to a random access request message that carries the random access preamble code, and sending the TAC to the terminal.

5 Claims, 17 Drawing Sheets

Related U.S. Application Data continuation of application No. PCT/CN2012/079421, filed on Jul. 31, 2012.

(51) Int. Cl.
*H04W 74/08* (2009.01)
*H04W 48/00* (2009.01)

(56) References Cited

U.S. PATENT DOCUMENTS

| | | |
|---|---|---|
| 2011/0275374 A1 | 11/2011 | Narasimha et al. |
| 2012/0026976 A1 | 2/2012 | Chang et al. |
| 2012/0076126 A1 | 3/2012 | Yi et al. |
| 2012/0218987 A1 | 8/2012 | Zhao et al. |
| 2012/0257569 A1* | 10/2012 | Jang ............ H04W 76/19 370/328 |
| 2013/0114516 A1 | 5/2013 | Koo et al. |
| 2013/0235858 A1 | 9/2013 | Zhao et al. |
| 2014/0044074 A1 | 2/2014 | Chen et al. |
| 2014/0086213 A1 | 3/2014 | Kwon et al. |

FOREIGN PATENT DOCUMENTS

| | | |
|---|---|---|
| CN | 102595640 A | 7/2012 |
| EP | 2230872 A1 | 9/2010 |
| EP | 2343935 A2 | 7/2011 |
| EP | 2442470 A2 | 4/2012 |
| JP | 2011130090 A | 6/2011 |
| JP | 2012130065 A | 7/2012 |
| JP | 2012529783 A | 11/2012 |
| WO | WO2010143846 A2 | 12/2010 |
| WO | WO2011074201 A1 | 6/2011 |
| WO | WO2012059059 A1 | 5/2012 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 11)"; 3GPP TS 36.423 V11.1.0; Jun. 2012; 134 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 v10.5.0, Mar. 2012, 54 pages.

"3rd Generation Partnership Project; Technical Specification Group Radio Access Network; Evolved Universal Terrestrial Radio Access (E-UTRA); Radio Resource Control (RRC); Protocol specification (Release 11)"; 3GPP TS 36.331 v11.0.0, Jun. 2012, 302 pages.

InterDigital Communications; "Support for RACH on SCells in LTE CA"; 3GPP TSG-RAN WG2 #74; May 9-13, 2011; 3 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pages.

* cited by examiner

METHOD, APPARATUS, DEVICE AND NETWORK SYSTEM FOR ADDING SECONDARY SERVING CELL

CROSS-REFERENCE TO RELATED APPLICATIONS

This application is a continuation of U.S. patent application Ser. No. 14/611,428, filed on Feb. 2, 2015, which is a continuation of International Application No. PCT/CN2012/079421, filed on Jul. 31, 2012. All of the afore-mentioned patent applications are hereby incorporated by reference in their entireties.

TECHNICAL FIELD

The present invention relates to wireless communications technologies, and in particular, to a method for adding a secondary serving cell, an apparatus, a device, and a network system.

BACKGROUND

A type of network deployment has been introduced to a next generation wireless network, and in this type of network deployment, one base station has two cells of different frequencies, and a terminal may maintain connection to the two cells of different frequencies of one base station simultaneously. Of the cells that maintain connection to one terminal, one is a primary serving cell and the other is a secondary serving cell. FIG. 1 is a schematic signaling diagram of a network system. As shown in FIG. 1, communication between a terminal and a base station may be divided into the following several steps: first, the base station sends a random access resource allocation message to the terminal over a primary serving cell, where the message includes a serial number of a random access preamble code and a serial number of a physical random access channel (Physical Random Access Channel, hereinafter referred to as PRACH) mask code, and the message uses a cell radio network temporary identifier (Cell Radio Network Temporary Identifier, hereinafter referred to as C-RNTI) to scramble the random access resource allocation message; second, after using the C-RNTI to descramble the received random access resource allocation message, the terminal sends a random access request message to the base station over a secondary serving cell according to the random access resource allocation message received by the terminal, where the random access request message includes a random access preamble code; third, the base station sends a random access response message to the terminal over the primary serving cell according to the received random access request message, where the random access response message includes a time advance command TAC (Time Advance Command, hereinafter referred to as TAC); and finally, the terminal adjusts, according to the random access response message sent by the base station, time advance (Time Advance, hereinafter referred to as TA) of the terminal on the secondary serving cell.

In actual network deployment, the primary serving cell and the secondary serving cell may also belong to different base stations. A base station to which the primary serving cell belongs is referred to as a primary base station, and a base station to which the secondary serving cell belongs is referred to as a secondary base station. FIG. 2 is a schematic signaling diagram of a network system. As shown in FIG. 2, an overall communication process of the system is as follows: first, a primary base station sends a random access resource allocation message to a terminal; second, the terminal sends a random access request message to a secondary base station; and finally, the primary base station sends a random access response message to the terminal.

In a process of implementing the present invention, the finds that normal communication cannot be performed when the primary serving cell and the secondary serving cell are connected but a delay over the connection is relatively long and a capacity is relatively small, wherein the capacity is the maximum data transfer rate of backhaul link between primary cell and secondary cell, as specifically shown in FIG. 2. First, the secondary base station does not know content of a random access resource allocation message sent by the primary base station to the terminal is, and as a result, a random access request message cannot be correctly received. Second, the primary base station does not know when the secondary base station receives the random access request message sent by the terminal and cannot determine when to send a random access response message to the terminal. Third, because the primary base station does not know content of the random access request message sent by the terminal to the secondary base station, the primary base station cannot correctly send the random access response message to the terminal.

SUMMARY

Embodiments of the present invention provide a method for adding a secondary serving cell, an apparatus, a device, and a network system. According to the technical solutions provided in the embodiments of the present invention, a primary serving cell and a secondary serving cell can still work properly when the primary serving cell and the secondary serving cell belong to different base stations, or a delay over the connection between the primary serving cell and the secondary serving cell is relatively long and a capacity is relatively small.

An embodiment of the present invention provides a method for adding a secondary serving cell, and the method includes:

receiving, by a terminal, a random access resource allocation message sent by a primary base station, where the random access resource allocation message includes a serial number of a random access preamble code and a serial number of a physical random access channel mask code;

sending, by the terminal, a random access request message to a secondary base station by using a sending resource that is determined according to the serial number of the physical random access channel mask code, where the random access request message includes the random access preamble code that is determined according to the serial number of the random access preamble code;

receiving, by the terminal, a random access response message sent by the primary base station, where the random access response message includes a time advance command TAC that is sent by the secondary base station to the primary base station and is determined by the secondary base station according to the random access request message; and adjusting, by the terminal according to the TAC, time advance TA of the terminal on a secondary serving cell corresponding to the secondary base station.

Further, before the receiving, by a terminal, a random access resource allocation message sent by a primary base station, the terminal further receives a cell radio network temporary identifier sent by the primary base station; and after the receiving, by a terminal, a random access resource allocation message sent by a primary base station, the terminal uses the cell radio network temporary identifier to descramble the random access resource allocation message.

An embodiment of the present invention provides a method for adding a secondary serving cell, and the method includes:

sending, by a primary base station, a random access resource allocation message and a secondary serving cell addition request message to a terminal and a secondary base station, respectively, where both the random access resource allocation message and the secondary serving cell addition request message include a serial number of a random access preamble code and a serial number of a physical random access channel mask code;

receiving, by the primary base station, a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message; and sending, by the primary base station to the terminal, a random access response message that carries the TAC, so that the terminal adjusts, according to the TAC, time advance TA of the terminal on a secondary serving cell corresponding to the secondary base station.

Further, before the sending, by a primary base station, a random access resource allocation message to a terminal, the primary base station further sends a cell radio network temporary identifier of the terminal to the terminal; and the primary base station uses the cell radio network temporary identifier of the terminal to scramble the random access resource allocation message, and then sends the random access resource allocation message to the terminal.

Further, the time advance command TAC transmission message further includes a first time at which the secondary base station receives the random access request message; and correspondingly, the primary base station determines, according to the first time, a second time for sending the random access response message.

An embodiment of the present invention provides a method for adding a secondary serving cell, and the method includes:

receiving, by a secondary base station, a secondary serving cell addition request message sent by a primary base station, where the secondary serving cell addition request message includes a serial number of a random access preamble code and a serial number of a physical random access channel mask code;

receiving, by the secondary base station according to the secondary serving cell addition request message, a random access request message that is sent by a terminal and carries the random access preamble code obtained according to the serial number of the random access preamble code; and obtaining, by the secondary base station, a time advance command TAC according to the random access request message, and sending, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

Further, the time advance command TAC transmission message further includes a first time at which the secondary base station receives the random access request message, so that the primary base station determines, according to the first time, a second time for sending the random access response message.

An embodiment of the present invention provides a terminal, and the terminal includes:

a first unit, configured to receive a random access resource allocation message sent by a primary base station, where the random access resource allocation message includes a serial number of a random access preamble code and a serial number of a physical random access channel mask code;

a second unit, configured to send a random access request message to a secondary base station by using a sending resource that is determined according to the serial number of the physical random access channel mask code, where the random access request message includes the random access preamble code that is determined according to the serial number of the random access preamble code;

a third unit, configured to receive a random access response message sent by the primary base station, where the random access response message includes a time advance command TAC that is sent by the secondary base station to the primary base station and is determined by the secondary base station according to the random access request message; and a fourth unit, configured to adjust, according to the TAC, time advance TA of the terminal on a secondary serving cell corresponding to the secondary base station.

An embodiment of the present invention provides a primary base station, and the primary base station includes:

a fifth unit, configured to send a random access resource allocation message and a secondary serving cell addition request message to a terminal and a secondary base station, respectively, where both the random access resource allocation message and the secondary serving cell addition request message include a serial number of a random access preamble code and a serial number of a physical random access channel mask code;

a sixth unit, configured to receive a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message; and a seventh unit, configured to send, to the terminal, a random access response message that carries the TAC, so that the terminal adjusts, according to the TAC, time advance TA of the terminal on a secondary serving cell corresponding to the secondary base station.

Further, the time advance command TAC transmission message further includes a first time at which the secondary base station receives the random access request message; and correspondingly, the seventh unit is further configured to determine, according to the first time, a second time for sending the random access response message.

An embodiment of the present invention provides a secondary base station, and the secondary base station includes:

an eighth unit, configured to receive a secondary serving cell addition request message sent by a primary base station, where the secondary serving cell addition request message includes a serial number of a random access preamble code and a serial number of a physical random access channel mask code;

a ninth unit, configured to receive, according to the secondary serving cell addition request message, a random access request message that is sent by a terminal and carries the random access preamble code; and a tenth unit, configured to obtain a time advance command TAC according to the random access request message, and send, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

Further, the time advance command TAC transmission message further includes a first time at which the secondary base station receives the random access request message, so that the primary base station determines, according to the first time, a second time for sending the random access response message.

A terminal device, including:

a first receiving unit, configured to receive a random access resource allocation message sent by a primary base station, where the random access resource allocation message includes a serial number of a random access preamble code and a serial number of a physical random access channel mask code;

a first sending unit, configured to send a random access request message to a secondary base station by using a sending resource that is determined according to the serial number of the physical random access channel mask code, where the random access request message includes the random access preamble code that is determined according to the serial number of the random access preamble code;

a second receiving unit, configured to receive a random access response message sent by the primary base station, where the random access response message includes a time advance command TAC that is sent by the secondary base station to the primary base station and is determined by the secondary base station according to the random access request message; and a first processing unit, configured to adjust, according to the TAC, time advance TA of the terminal on a secondary serving cell corresponding to the secondary base station.

A primary base station, including:

a second sending unit, configured to send a random access resource allocation message and a secondary serving cell addition request message to a terminal and a secondary base station, respectively, where both the random access resource allocation message and the secondary serving cell addition request message include a serial number of a random access preamble code and a serial number of a physical random access channel mask code;

a third receiving unit, configured to receive a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message; and a third sending unit, configured to send, to the terminal, a random access response message that carries the TAC, so that the terminal adjusts, according to the TAC, time advance TA of the terminal on a secondary serving cell corresponding to the secondary base station.

According to the foregoing primary base station device, the time advance command TAC transmission message further includes a first time at which the secondary base station receives the random access request message; and correspondingly, the third sending unit is further configured to determine, according to the first time, a second time for sending the random access response message.

A secondary base station device, including:

a fourth receiving unit, configured to receive a secondary serving cell addition request message sent by a primary base station, where the secondary serving cell addition request message includes a serial number of a random access preamble code and a serial number of a physical random access channel mask code;

a fifth receiving unit, configured to receive, according to the secondary serving cell addition request message, a random access request message that is sent by a terminal and carries the random access preamble code; and a fourth sending unit, configured to obtain a time advance command TAC according to the random access request message, and send, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

According to the foregoing secondary base station device, the time advance command TAC transmission message further includes a first time at which the secondary base station receives the random access request message, so that the primary base station determines, according to the first time, a second time for sending the random access response message.

An embodiment of the present invention provides a network system, and the network system includes the terminal, the primary base station, and the secondary base station provided in the foregoing embodiments.

An embodiment of the present invention provides a network system, and the network system includes the terminal device, the primary base station device, and the secondary base station device provided in the foregoing embodiments.

An embodiment of the present invention yet provides a method for adding a secondary serving cell, and the method includes:

receiving, by a terminal, a notification message sent by a primary base station, where the notification message includes a serial number of a random access preamble code and a serial number of a physical random access channel mask code;

sending, by the terminal, a random access request message to a secondary base station by using a sending resource that is determined according to the serial number of the physical random access channel mask code, where the random access request message includes the random access preamble code that is determined according to the serial number of the random access preamble code;

receiving, by the terminal, a random access response message sent by the secondary base station, where the random access response message includes a time advance command TAC that is determined by the secondary base station according to the random access request message; and adjusting, by the terminal according to the TAC, time advance TA of the terminal on a secondary serving cell corresponding to the secondary base station.

Further, the notification message is a reconfiguration message or a random access resource allocation message; when the notification message is a random access resource allocation message, the terminal further receives a reconfiguration message sent by the primary base station; and correspondingly, the reconfiguration message further includes a random access response window size, of the secondary serving cell, that is used by the terminal to receive the random access response message.

Further, before the receiving, by a terminal, a notification message sent by a primary base station, the terminal further receives a cell radio network temporary identifier sent by the primary base station; and after the receiving, by a terminal, a notification message sent by a primary base station, the terminal uses the cell radio network temporary identifier of the terminal to perform descrambling, to obtain the serial number of the random access preamble code and the serial number of the physical random access channel mask code.

An embodiment of the present invention yet provides a method for adding a secondary serving cell, and the method includes:

receiving, by a secondary base station, a secondary serving cell addition request message sent by a primary base station, where the secondary serving cell addition request message includes a serial number of a random access preamble code and a serial number of a physical random access channel mask code;

receiving, by the secondary base station according to the secondary serving cell addition request message, a random access request message that is sent by a terminal and carries the random access preamble code obtained according to the serial number of the random access preamble code; and obtaining, by the secondary base station, a time advance command TAC according to the random access request message, and sending, to the terminal, a random access response message that carries the TAC, so that the terminal adjusts, according to the TAC, time advance TA of the terminal on a secondary serving cell corresponding to the secondary base station.

An embodiment of the present invention still provides a method for adding a secondary serving cell, and the method includes:

sending, by a secondary base station, a secondary serving cell addition response message to a primary base station, where the secondary serving cell addition response message includes a serial number of a random access preamble code and a serial number of a physical random access channel mask code;

receiving, by the secondary base station, a random access request message that is sent by a terminal and carries the random access preamble code obtained according to the serial number of the random access preamble code; and obtaining, by the secondary base station, a time advance command TAC according to the random access request message, and sending, to the terminal, a random access response message that carries the TAC, so that the terminal adjusts, according to the TAC, time advance TA of the terminal on a secondary serving cell corresponding to the secondary base station.

Further, the secondary serving cell addition response message further includes a random access response window size, of the secondary serving cell, that is used by the terminal to receive the random access response message.

An embodiment of the present invention yet provides a terminal, and the terminal includes:

an eleventh unit, configured to receive a notification message sent by a primary base station, where the notification message includes a serial number of a random access preamble code and a serial number of a physical random access channel mask code;

a twelfth unit, configured to send a random access request message to a secondary base station by using a sending resource that is determined according to the serial number of the physical random access channel mask code, where the random access request message includes the random access preamble code that is determined according to the serial number of the random access preamble code;

a thirteenth unit, configured to receive a random access response message sent by the secondary base station, where the random access response message includes a time advance command TAC that is determined by the secondary base station according to the random access request message; and a fourteenth unit, configured to adjust, according to the TAC, time advance TA of the terminal on a secondary serving cell corresponding to the secondary base station.

An embodiment of the present invention yet provides a secondary base station, and the secondary base station includes:

a fifteenth unit, configured to receive a secondary serving cell addition request message sent by a primary base station, where the secondary serving cell addition request message includes a serial number of a random access preamble code and a serial number of a physical random access channel mask code;

a sixteenth unit, configured to receive, according to the secondary serving cell addition request message, a random access request message that is sent by a terminal and carries the random access preamble code obtained according to the serial number of the random access preamble code; and a seventeenth unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

An embodiment of the present invention still provides a secondary base station, and the secondary base station includes:

an eighteenth unit, configured to send a secondary serving cell addition response message to a primary base station, where the secondary serving cell addition response message includes a serial number of a random access preamble code and a serial number of a physical random access channel mask code;

a nineteenth unit, configured to receive a random access request message that is sent by a terminal and carries the random access preamble code obtained according to the serial number of the random access preamble code; and a twentieth unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition response message further includes a random access response window size, of the secondary serving cell, that is used by the terminal to receive the random access response message.

A terminal device, including:

a sixth receiving unit, configured to receive a notification message sent by a primary base station, where the notification message includes a serial number of a random access preamble code and a serial number of a physical random access channel mask code;

a fifth sending unit, configured to send a random access request message to a secondary base station by using a sending resource that is determined according to the serial number of the physical random access channel mask code, where the random access request message includes the random access preamble code that is determined according to the serial number of the random access preamble code;

a seventh receiving unit, configured to receive a random access response message sent by the secondary base station, where the random access response message includes a time advance command TAC that is determined by the secondary base station according to the random access request message; and a second processing unit, configured to adjust, according to the TAC, time advance TA of the terminal on a secondary serving cell corresponding to the secondary base station.

According to the foregoing terminal device, the notification message is a reconfiguration message or a random access resource allocation message; when the notification message is a random access resource allocation message, a terminal further receives a reconfiguration message sent by the primary base station; and correspondingly, the reconfiguration message further includes a random access response window size, of the secondary serving cell, that is used by the terminal to receive the random access response message.

According to the foregoing terminal device, before a terminal receives the notification message sent by the primary base station, the terminal further receives a cell radio network temporary identifier sent by the primary base station; and after a terminal receives the notification message sent by the primary base station, the terminal uses the cell radio network temporary identifier to perform descrambling, to obtain the serial number of the random access preamble code and the serial number of the physical random access channel mask code.

A secondary base station device, including:

an eighth receiving unit, configured to receive a secondary serving cell addition request message sent by a primary base station, where the secondary serving cell addition request message includes a serial number of a random access preamble code and a serial number of a physical random access channel mask code;

a ninth receiving unit, configured to receive, according to the secondary serving cell addition request message, a random access request message that is sent by a terminal and carries the random access preamble code obtained according to the serial number of the random access preamble code; and a sixth sending unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

A secondary base station device, including:

a seventh sending unit, configured to send a secondary serving cell addition response message to a primary base station, where the secondary serving cell addition response message includes a serial number of a random access preamble code and a serial number of a physical random access channel mask code;

a tenth receiving unit, configured to receive a random access request message that is sent by a terminal and carries the random access preamble code obtained according to the serial number of the random access preamble code; and an eighth sending unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition response message further includes a random access response window size, of the secondary serving cell, that is used by the terminal to receive the random access response message.

An embodiment of the present invention yet provides a network system, and the network system includes the terminal, the secondary base station, and the primary base station provided in the foregoing embodiments.

An embodiment of the present invention yet provides a network system, and the network system includes the terminal device, the secondary base station device, and the primary base station device provided in the foregoing embodiments.

An embodiment of the present invention still provides a method for adding a secondary serving cell, and the method includes:

receiving, by a terminal, a random access resource allocation message sent by a secondary base station, where the random access resource allocation message includes a serial number of a random access preamble code and a serial number of a physical random access channel mask code;

sending, by the terminal, a random access request message to a secondary base station by using a sending resource that is determined according to the serial number of the physical random access channel mask code, where the random access request message includes the random access preamble code that is determined according to the serial number of the random access preamble code;

receiving, by the terminal, a random access response message sent by the secondary base station, where the random access response message includes a time advance command TAC that is determined by the secondary base station according to the random access request message; and adjusting, by the terminal according to the TAC, time advance TA of the terminal on a secondary serving cell corresponding to the secondary base station.

Further, the method further includes: receiving, by the terminal, a reconfiguration message sent by a primary base station, where the reconfiguration message includes a random access response window size, of the secondary serving cell, that is used by the terminal to receive the random access response message, or the reconfiguration message includes the response window size and activation time, and the terminal determines, according to the activation time, a time for receiving the random access resource allocation message.

An embodiment of the present invention yet still provides a method for adding a secondary serving cell, and the method includes:

sending, by a secondary base station, a random access resource allocation message to a terminal after receiving a secondary serving cell addition request message sent by a primary base station, where the secondary serving cell addition request message includes a cell radio network temporary identifier of the terminal and the random access resource allocation message includes a serial number of a random access preamble code and a serial number of a physical random access channel mask code;

receiving, by the secondary base station, a random access request message that is sent by the terminal and carries the random access preamble code obtained according to the serial number of the random access preamble code; and obtaining, by the secondary base station, a time advance command TAC according to the random access request message, and sending, to the terminal, a random access response message that carries the TAC, so that the terminal adjusts, according to the TAC, time advance TA of the terminal on a secondary serving cell corresponding to the secondary base station.

Further, the secondary serving cell addition request message further includes activation time, and the secondary base station determines, according to the activation time, a time for sending the random access resource allocation message.

An embodiment of the present invention still further provides a method for adding a secondary serving cell, and the method includes:

after a secondary base station sends a secondary serving cell addition response message to a primary base station, sending a random access resource allocation message to a terminal, where the secondary serving cell addition response message includes a cell radio network temporary identifier of the terminal and the random access resource allocation message includes a serial number of a random access preamble code and a serial number of a physical random access channel mask code;

receiving, by the secondary base station, a random access request message that is sent by the terminal and carries the random access preamble code obtained according to the serial number of the random access preamble code; and obtaining, by the secondary base station, a time advance command TAC according to the random access request message, and sending, to the terminal, a random access response message that carries the TAC, so that the terminal adjusts, according to the TAC, time advance TA of the terminal on a secondary serving cell corresponding to the secondary base station.

Further, the secondary serving cell addition response message further includes activation time, and the secondary base station determines, according to the activation time, a time for sending the random access resource allocation message.

An embodiment of the present invention still provides a terminal, and the terminal includes:

a twenty-first unit, configured to receive a random access resource allocation message sent by a secondary base station, where the random access resource allocation message includes a serial number of a random access preamble code and a serial number of a physical random access channel mask code;

a twenty-second unit, configured to send a random access request message to a secondary base station by using a sending resource that is determined according to the serial number of the physical random access channel mask code, where the random access request message includes the random access preamble code that is determined according to the serial number of the random access preamble code;

a twenty-third unit, configured to receive a random access response message sent by the secondary base station, where the random access response message includes a time advance command TAC that is determined by the secondary base station according to the random access request message; and a twenty-fourth unit, configured to adjust, according to the TAC, time advance TA of the terminal on a secondary serving cell corresponding to the secondary base station.

Further, according to the foregoing terminal, the twenty-first unit is further configured to receive a reconfiguration message sent by a primary base station, where the reconfiguration message includes a random access response window size, of the secondary serving cell, that is used by the terminal to receive the random access response message, or the reconfiguration message includes the response window size and activation time, and the terminal determines, according to the activation time, a time for receiving the random access resource allocation message.

An embodiment of the present invention yet still provides a secondary base station, and the secondary base station includes:

a twenty-fifth unit, configured to, after receiving a secondary serving cell addition request message sent by a primary base station, send a random access resource allocation message to a terminal, where the secondary serving cell addition request message includes a cell radio network temporary identifier of the terminal and the random access resource allocation message includes a serial number of a random access preamble code and a serial number of a physical random access channel mask code;

a twenty-sixth unit, configured to receive a random access request message that is sent by the terminal and carries the random access preamble code obtained according to the serial number of the random access preamble code; and a twenty-seventh unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition request message further includes activation time, and the secondary base station determines, according to the activation time, a time for sending the random access resource allocation message.

An embodiment of the present invention still further provides a secondary base station, and the secondary base station includes:

a twenty-eighth unit, configured to, after sending a secondary serving cell addition response message to a primary base station, send a random access resource allocation message to a terminal, where the secondary serving cell addition response message includes a cell radio network temporary identifier of the terminal and the random access resource allocation message includes a serial number of a random access preamble code and a serial number of a physical random access channel mask code;

a twenty-ninth unit, configured to receive a random access request message that is sent by the terminal and carries the random access preamble code obtained according to the serial number of the random access preamble code; and a thirtieth unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition response message further includes activation time, and the secondary base station determines, according to the activation time, a time for sending the random access resource allocation message.

A terminal device, including:

an eleventh receiving unit, configured to receive a random access resource allocation message sent by a secondary base station, where the random access resource allocation message includes a serial number of a random access preamble code and a serial number of a physical random access channel mask code;

a ninth sending unit, configured to send a random access request message to a secondary base station by using a sending resource that is determined according to the serial number of the physical random access channel mask code, where the random access request message includes the random access preamble code that is determined according to the serial number of the random access preamble code;

a twelfth receiving unit, configured to receive a random access response message sent by the secondary base station, where the random access response message includes a time advance command TAC that is determined by the secondary base station according to the random access request message; and a third processing unit, configured to adjust, according to the TAC, time advance TA of the terminal on a secondary serving cell corresponding to the secondary base station.

According to the foregoing terminal device, the eleventh receiving unit is further configured to receive a reconfiguration message sent by a primary base station, where the reconfiguration message includes a random access response window size, of the secondary serving cell, that is used by a terminal to receive the random access response message, or the reconfiguration message includes the response window size and activation time, and the terminal determines, according to the activation time, a time for receiving the random access resource allocation message.

According to the foregoing terminal device, the eleventh receiving unit is further configured to, before receiving the random access resource allocation message, further receive a cell radio network temporary identifier of a terminal sent by a primary base station, where the terminal uses the cell radio network temporary identifier to descramble the received random access resource allocation message.

A secondary base station device, including:

a thirteenth receiving unit, configured to receive a secondary serving cell addition request message sent by a primary base station; a tenth sending unit, configured to, after receiving the secondary serving cell addition request message sent by the primary base station, send a random access resource allocation message to a terminal, where the secondary serving cell addition request message includes a cell radio network temporary identifier of the terminal and the random access resource allocation message includes a serial number of a random access preamble code and a serial number of a physical random access channel mask code;

a fourteenth receiving unit, configured to receive a random access request message that is sent by the terminal and carries the random access preamble code obtained according to the serial number of the random access preamble code; and an eleventh sending unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition request message further includes activation time, and the secondary base station determines, according to the activation time, a time for sending the random access resource allocation message.

A secondary base station device, including:

a twelfth sending unit, configured to, after sending a secondary serving cell addition response message to a primary base station, send a random access resource allocation message to a terminal, where the secondary serving cell addition response message includes a cell radio network temporary identifier of the terminal and the random access resource allocation message includes a serial number of a random access preamble code and a serial number of a physical random access channel mask code;

a fifteenth receiving unit, configured to receive a random access request message that is sent by the terminal and carries the random access preamble code obtained according to the serial number of the random access preamble code; and a thirteenth sending unit, configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition response message further includes activation time, and the secondary base station determines, according to the activation time, a time for sending the random access resource allocation message.

An embodiment of the present invention still provides a network system, and the network system includes the terminal, the secondary base station, and the primary base station provided in the foregoing embodiments.

An embodiment of the present invention still provides a network system, and the network system includes the terminal device, the secondary base station device, and the primary base station device provided in the foregoing embodiments.

According to the method for adding a secondary serving cell, the apparatus, the device, and the network system that are provided in the embodiments of the present invention, a unified serial number of a random access preamble code, a unified serial number of a PRACH mask code, and a unified cell radio network temporary identifier of a terminal are acquired by means of mutual communication between a primary base station and a secondary base station, and the serial number of the random access preamble code and the serial number of the PRACH mask code are scrambled by using the cell radio network temporary identifier of the terminal, and are then sent to the terminal, so that after using the cell radio network temporary identifier to descramble the serial number of a random access preamble code and the serial number of a PRACH mask code, the terminal learns about a random access preamble code and sends the random access preamble code to the secondary base station. The secondary base station determines a time advance command TAC according to a random access request message that carries the random access preamble code, and sends the time advance command TAC to the terminal, so that the terminal adjusts time advance TA of the terminal on a secondary serving cell corresponding to the secondary base station. By implementing technical solutions provided in the embodiments of the present invention, a primary serving cell and a secondary serving cell can still work properly when the primary serving cell and the secondary serving cell separately belong to different base stations, or a delay over a connection between the primary serving cell and the secondary serving cell is relatively long and a capacity is relatively small.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

The following further describes the present invention in detail by using specific embodiments and with reference to accompanying drawings.

Figure 1:
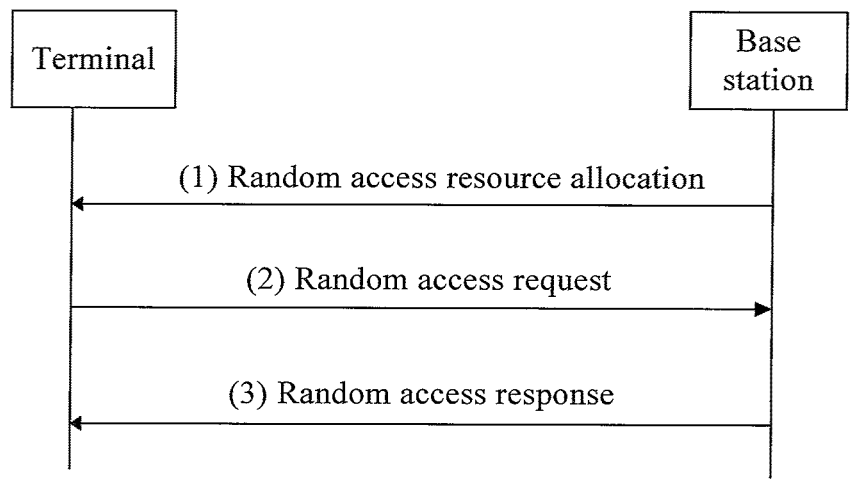
FIG. 1 is a schematic signaling diagram of a network system.
Figure 2:
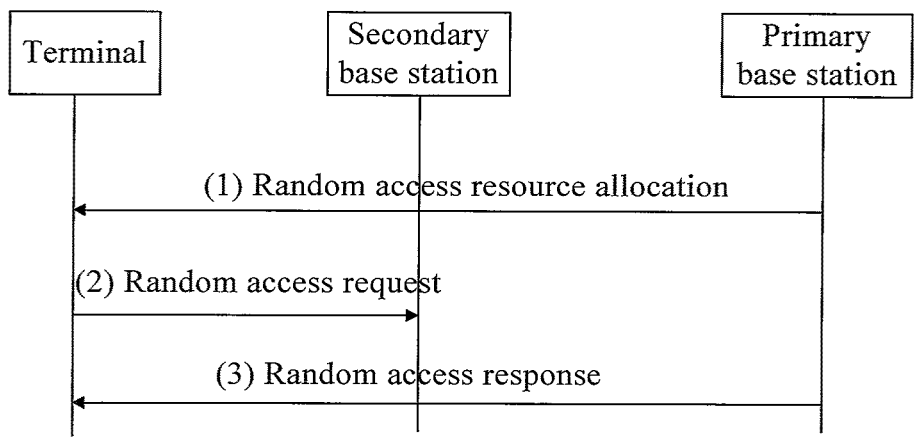
FIG. 2 is a schematic signaling diagram of a network system.
Figure 3:
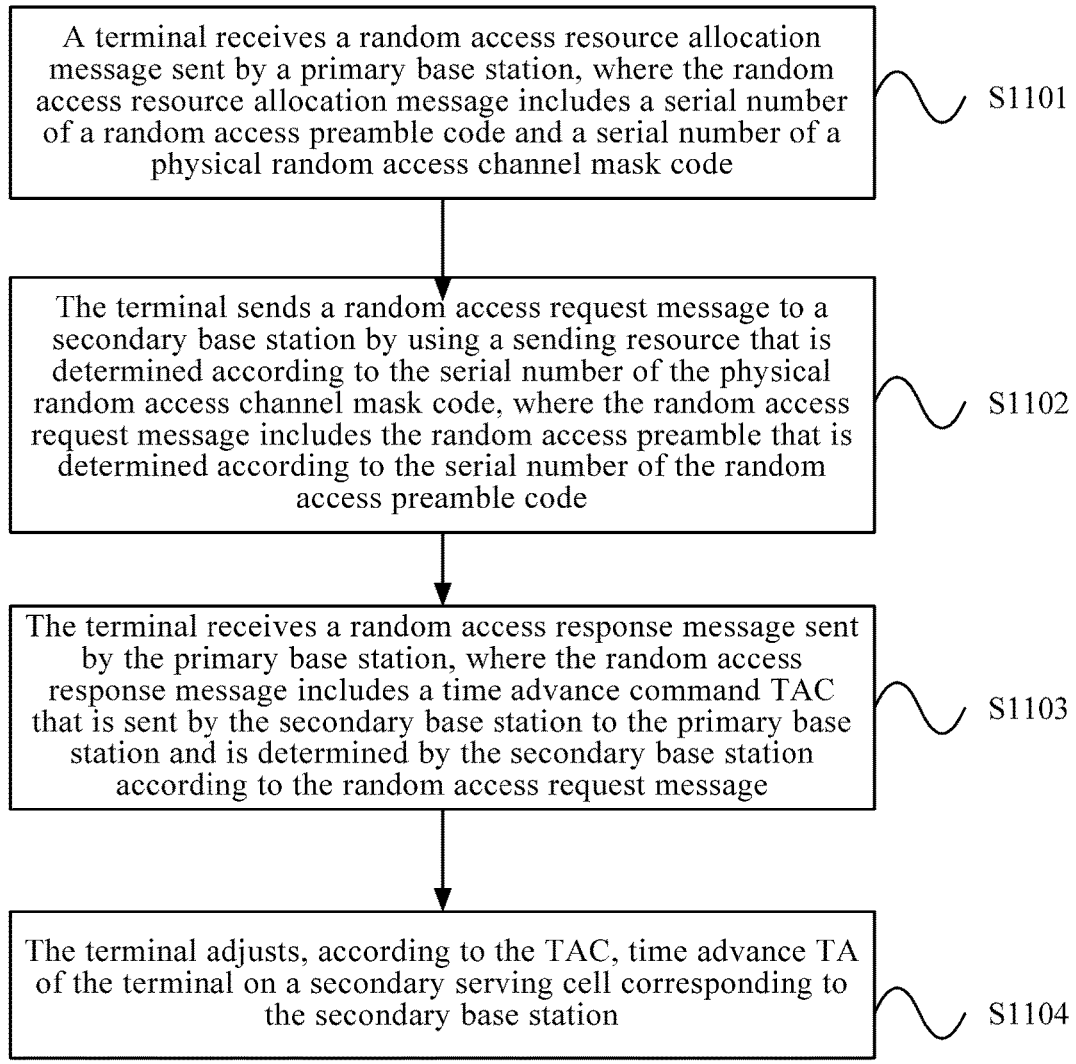
FIG. 3 is a schematic flowchart 1 of an embodiment of a method for adding a secondary serving cell according to the present invention.

FIG. 3 is a schematic flowchart 1 of an embodiment of a method for adding a secondary serving cell according to the present invention. The method applies to a terminal, and includes the following steps:

Step 1101: The terminal receives a random access resource allocation message sent by a primary base station, where the random access resource allocation message includes a serial number of a random access preamble code and a serial number of a physical random access channel mask code.

Specifically, the terminal in this embodiment of the present invention gains contact first with the primary base station. A cell in which the terminal is located may be a primary serving cell to which the primary base station belongs or may be a secondary serving cell to which the secondary base station belongs. When the terminal is in the secondary serving cell, to prevent a problem from occurring during communication between the terminal and the secondary base station, the secondary base station needs to communicate with the primary base station to acquire same signaling, so that the terminal can also communicate with the secondary base station properly. First, the primary base station sends the random access resource allocation message to the terminal, where the random access resource allocation message includes the serial number of the random access preamble code and the serial number of the PRACH mask code.

Step 1102: The terminal sends a random access request message to a secondary base station by using a sending resource that is determined according to the serial number of the physical random access channel mask code, where the random access request message includes the random access preamble code that is determined according to the serial number of the random access preamble code.

Specifically, the terminal determines, according to the serial number of the PRACH mask code, the resource for sending the random access request message to the secondary base station. The terminal further determines, according to the received serial number of the random access preamble code, the random access preamble code sent to the secondary base station.

Step 1103: The terminal receives a random access response message sent by the primary base station, where the random access response message includes a time advance command TAC that is sent by the secondary base station to the primary base station and is determined by the secondary base station according to the random access request message.

Specifically, the terminal receives the time advance command TAC sent by the primary base station, where the time advance command TAC is sent by the secondary base station to the primary base station and the time advance command TAC is determined by the secondary base station according to the random access request message that is sent by the terminal.

Step 1104: The terminal adjusts, according to the TAC, time advance TA of the terminal on a secondary serving cell corresponding to the secondary base station.

Specifically, the terminal adjusts, according to the received time advance command TAC, the time advance TA of the terminal on the corresponding cell.

Further, before the terminal receives the random access resource allocation message sent by the primary base station, the terminal further receives a cell radio network temporary identifier sent by the primary base station; and after the terminal receives the random access resource allocation message sent by the primary base station, the terminal uses the cell radio network temporary identifier of the terminal to descramble the random access resource allocation message.

Specifically, the cell radio network temporary identifier is sent by the primary base station to the terminal in advance. That is, before the terminal receives the serial number of the random access preamble code and the serial number of the physical random access channel mask code sent by the primary base station, the terminal has received the cell radio network temporary identifier sent by the primary base station, and the terminal uses the cell radio network temporary identifier to descramble the received random access resource allocation message, to obtain the serial number of the random access preamble code and the serial number of the physical random access channel mask code.

Figure 4:
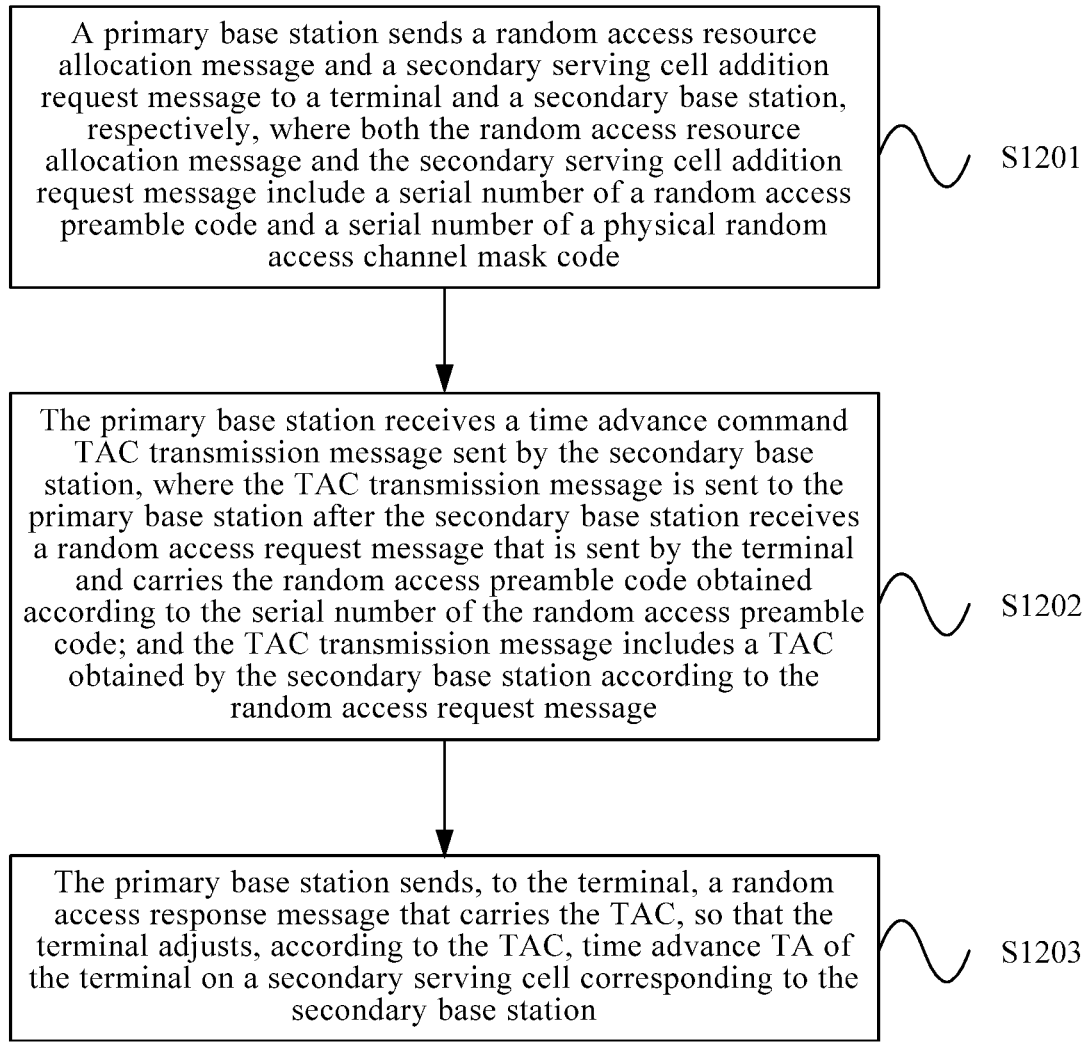
FIG. 4 is a schematic flowchart 2 of an embodiment of a method for adding a secondary serving cell according to the present invention.

FIG. 4 is a schematic flowchart 2 of an embodiment of a method for adding a secondary serving cell according to the present invention. The method applies to a primary base station, and includes the following steps:

Step 1201: The primary base station sends a random access resource allocation message and a secondary serving cell addition request message to a terminal and a secondary base station, respectively, where both the random access resource allocation message and the secondary serving cell addition request message include a serial number of a random access preamble code and a serial number of a physical random access channel mask code.

Specifically, the primary base station sends the serial number of the random access preamble code and the serial number of the PRACH mask code to the secondary base station, and the primary base station also sends the same serial number of the random access preamble code and serial number of the PRACH mask code to the terminal.

Step 1202: The primary base station receives a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message.

Specifically, the primary base station receives the time advance command TAC transmission message sent by the secondary base station, where the time advance command TAC transmission message is sent by secondary base station to the primary base station and the time advance command TAC transmission message is determined by the secondary base station according to the random access request message that is sent by the terminal to the secondary base station and carries the random access preamble code. The time advance command TAC transmission message includes the TAC that is obtained by the secondary base station according to the random access request message.

Step 1203: The primary base station sends, to the terminal, a random access response message that carries the TAC, so that the terminal adjusts, according to the TAC, time advance TA of the terminal on a secondary serving cell corresponding to the secondary base station.

Specifically, the primary base station sends the TAC to the terminal, so that the terminal adjusts, according to the TAC, the time advance TA of the terminal on the secondary serving cell corresponding to the secondary base station.

Further, before sending the random access resource allocation message to the terminal, the primary base station further sends a cell radio network temporary identifier of the terminal to the terminal; and the primary base station uses the cell radio network temporary identifier of the terminal to scramble the random access resource allocation message, and then sends the random access resource allocation message to the terminal.

Specifically, before sending the random access resource allocation message to the terminal, the primary base station further sends the cell radio network temporary identifier of the terminal to the terminal; and the primary base station applies the cell radio network temporary identifier to scramble the random access resource allocation message, and then sends the random access resource allocation message to the terminal.

Further, the time advance command TAC transmission message received by the primary base station includes a first time at which the secondary base station receives the random access request message; and the primary base station determines, according to the first time, a second time for sending the random access response message.

Specifically, a time at which the secondary base station receives the random access request message sent by the terminal is the first time, and the primary base station determines, according to the first time, that a time for sending the random access response message to the terminal is the second time.

Figure 5:
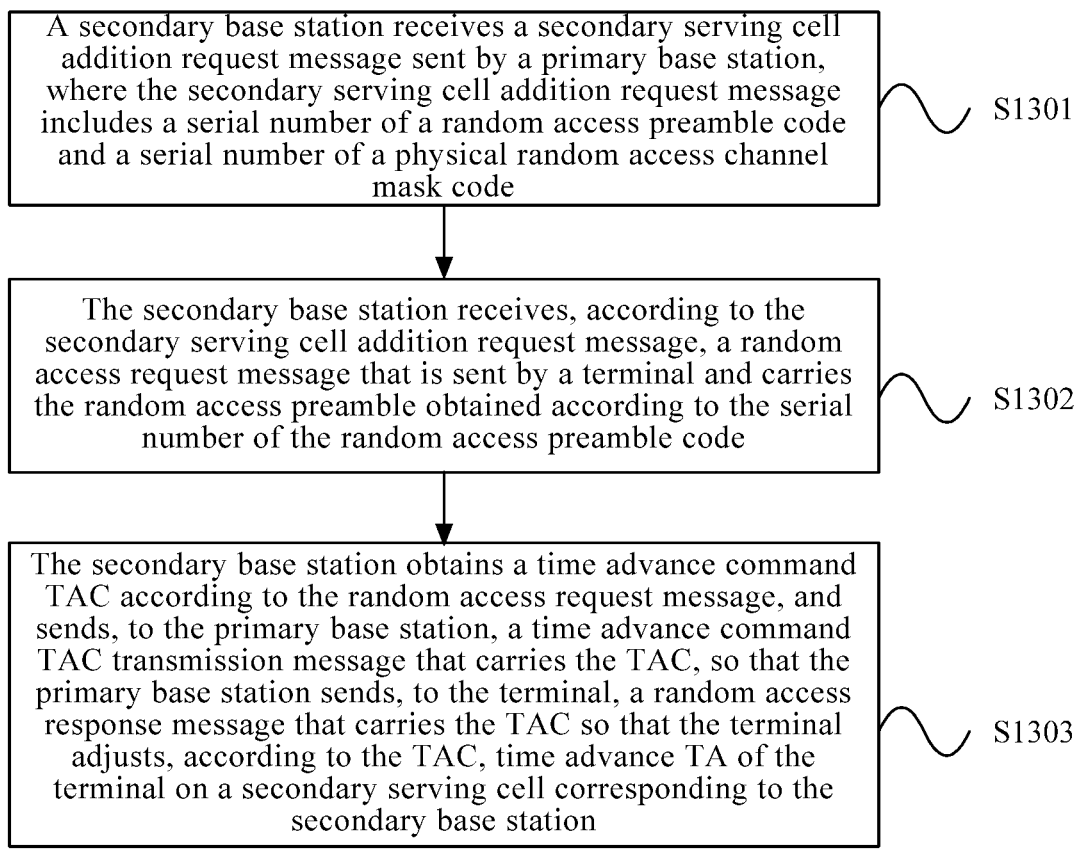
FIG. 5 is a schematic flowchart 3 of an embodiment of a method for adding a secondary serving cell according to the present invention.

FIG. 5 is a schematic flowchart 3 of an embodiment of a method for adding a secondary serving cell according to the present invention. The method applies to a secondary base station, and includes the following steps:

Step 1301: The secondary base station receives a secondary serving cell addition request message sent by a primary base station, where the secondary serving cell addition request message includes a serial number of a random access preamble code and a serial number of a physical random access channel mask code.

Specifically, the secondary base station receives the serial number of the random access preamble code and the serial number of the PRACH mask code sent by the primary base station.

Step 1302: The secondary base station receives, according to the secondary serving cell addition request message, a random access request message that is sent by a terminal and carries the random access preamble code obtained according to the serial number of the random access preamble code.

Specifically, the secondary base station determines, according to the received serial number of the random access preamble code and serial number of the physical random access channel mask code, the random access preamble code sent by the terminal, where the random access preamble code is determined by the serial number of the random access preamble code.

Step 1303: The secondary base station obtains a time advance command TAC according to the random access request message, and sends, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

Specifically, the secondary base station determines the time advance command TAC according to the received random access request message, and sends, to the primary base station, the transmission message that carries the time advance command TAC, so that the primary base station determines, according to the time advance command TAC, a TAC sent to the terminal so that the terminal adjusts, according to the TAC, the time advance TA of the terminal on the secondary serving cell corresponding to the secondary base station.

Further, the time advance command TAC transmission message sent by the secondary base station further includes a first time at which the secondary base station receives the random access request message, so that the primary base station determines, according to the first time, a second time for sending the random access response message.

Specifically, a time at which the secondary base station receives the random access request message sent by the terminal is the first time, and the primary base station determines, according to the first time, that a time for sending the random access response message to the terminal is the second time.

Figure 6:
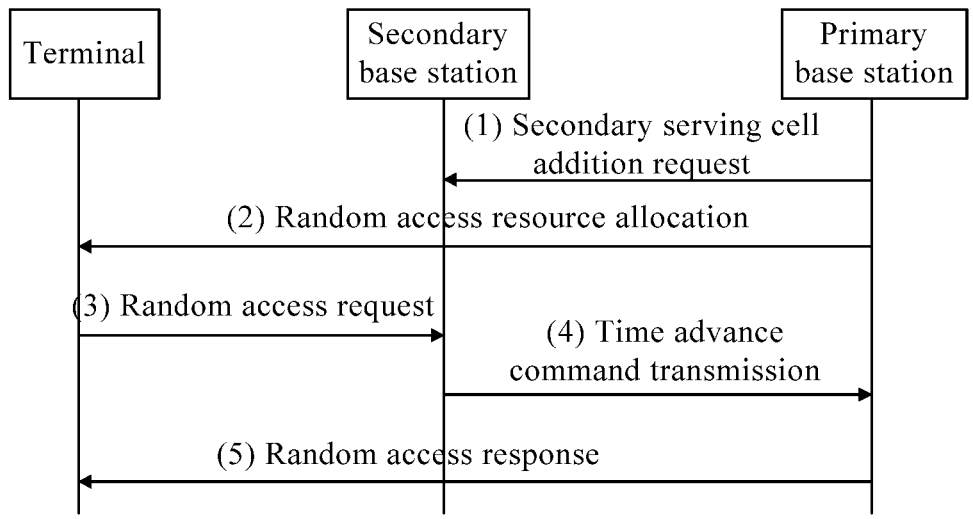
FIG. 6 is a schematic diagram of signaling of a first embodiment of a network system according to the present invention.

FIG. 6 is a schematic signaling diagram of a first embodiment of a network system according to the present invention. As shown in FIG. 6, transmission of the signaling is divided into five steps. Step 1: A primary base station sends a secondary serving cell addition request message to a secondary base station. Step 2: The primary base station sends a random access resource allocation message to a terminal. Both the secondary serving cell addition request message and the random access resource allocation message include a serial number of a random access preamble code and a serial number of a PRACH mask code, and step 1 and step 2 may be interchangeable. Step 3: The terminal sends a random access request message to the secondary base station according to the random access resource allocation message that is sent by the primary base station, where the random access request message includes a random access preamble code. Step 4: The secondary base station sends a time advance command TAC transmission message to the primary base station according to the received random access request message, where the time advance command TAC transmission message includes a first time at which the secondary base station receives the random access request message, and the primary base station determines, according to the first time, a second time for sending a random access response message. Step 5: The primary base station sends, to the terminal, the random access response message according to the received time advance command TAC transmission message, where the random access response message includes a time advance command TAC that is sent by the secondary base station to the primary base station and is determined according to the random access request message sent by the terminal, so that the terminal adjusts, according to the received random access response message, time advance TA of the terminal on a corresponding cell. Before step 2, the terminal further receives a cell radio network temporary identifier sent by the primary base station; the primary base station uses the cell radio network temporary identifier to scramble the random access resource allocation message, and then sends the random access resource allocation message to the terminal; and the terminal uses the cell radio network temporary identifier to descramble the received random access resource allocation message.

According to the method for adding a secondary serving cell, the apparatus, the device, and the network system that are provided in the embodiments of the present invention, a primary base station sends a secondary serving cell addition request message to a secondary base station, so that the secondary base station can correctly receive a random access request message sent by a terminal; and then the secondary base station sends a time advance command transmission message to the primary base station according to the received random access request message, thereby ensuring that the primary base station can determine content of a random access response message and a time for sending the message to the terminal according to the transmission message. According to the embodiments of the present invention, a primary serving cell and a secondary serving cell can still work properly when the primary serving cell and the secondary serving cell belong to different base stations, or a delay over a connection between the primary serving cell and the secondary serving cell is relatively long and a capacity is relatively small.

Figure 7:
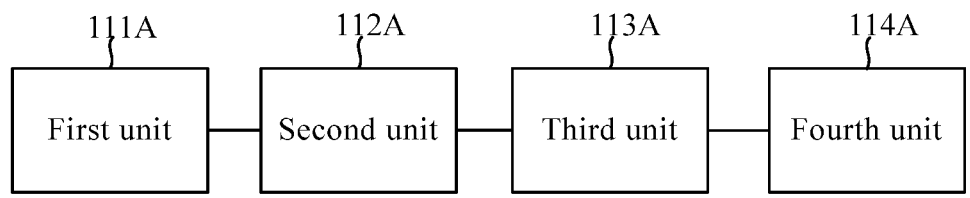
FIG. 7 is a schematic structural diagram 1 of an apparatus embodiment for adding a secondary serving cell according to the present invention.

FIG. 7 is a schematic structural diagram 1 of an apparatus embodiment for adding a secondary serving cell according to the present invention. As shown in FIG. 7, a terminal includes a first unit 111A, a second unit 112A, a third unit 113A, and a fourth unit 114A. The first unit 111A is configured to receive a random access resource allocation message sent by a primary base station, where the random access resource allocation message includes a serial number of a random access preamble code and a serial number of a physical random access channel mask code. The second unit 112A is configured to send a random access request message to a secondary base station by using a sending resource that is determined according to the serial number of the physical random access channel mask code, where the random access request message includes the random access preamble code that is determined according to the serial number of the random access preamble code. The third unit 113A is configured to receive a random access response message sent by the primary base station, where the random access response message includes a time advance command TAC that is sent by the secondary base station to the primary base station and is determined by the secondary base station according to the random access request message. The fourth unit 114A is configured to adjust, according to the TAC, time advance TA of the terminal on a secondary serving cell corresponding to the secondary base station.

Further, before the first unit 111A receives the random access resource allocation message sent by the primary base station, the terminal further receives a cell radio network temporary identifier of the terminal sent by the primary base station. After receiving the random access resource allocation message sent by the primary base station, the terminal uses the cell radio network temporary identifier of the terminal to descramble the random access resource allocation message.

Figure 8:
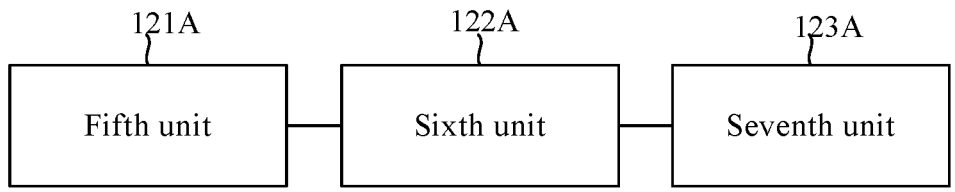
FIG. 8 is a schematic structural diagram 2 of an apparatus embodiment for adding a secondary serving cell according to the present invention.

FIG. 8 is a schematic structural diagram 2 of an apparatus embodiment for adding a secondary serving cell according to the present invention. As shown in FIG. 8, the primary base station includes a fifth unit 121A, a sixth unit 122A, and a seventh unit 123A. The fifth unit 121A is configured to send a random access resource allocation message and a secondary serving cell addition request message to a terminal and a secondary base station, respectively, and both the random access resource allocation message and the secondary serving cell addition request message include a serial number of a random access preamble code and a serial number of a physical random access channel mask code. The sixth unit 122A is configured to receive a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message. The seventh unit 123A is configured to send, to the terminal, a random access response message that carries the TAC, so that the terminal adjusts, according to the TAC, time advance TA of the terminal on a secondary serving cell corresponding to the secondary base station.

Further, before sending the random access resource allocation message to the terminal, the fifth unit 121A further sends a cell radio network temporary identifier of the terminal to the terminal; the primary base station uses the cell radio network temporary identifier of the terminal to scramble the random access resource allocation message, and then sends the random access resource allocation message to the terminal.

Further, according to the foregoing primary base station, the time advance command TAC transmission message includes a first time at which the secondary base station receives the random access request message; and the seventh unit is further configured to determine, according to the first time, a second time for sending the random access response message.

Figure 9:
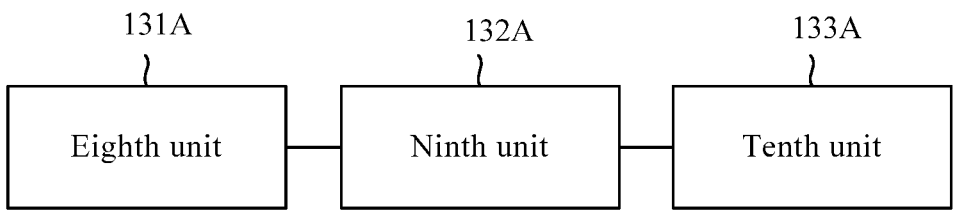
FIG. 9 is a schematic structural diagram 3 of an apparatus embodiment for adding a secondary serving cell according to the present invention.

FIG. 9 is a schematic structural diagram 3 of an apparatus embodiment for adding a secondary serving cell according to the present invention. As shown in FIG. 9, a secondary base station includes an eighth unit 131A, a ninth unit 132A, and a tenth unit 133A. The eighth unit 131A is configured to receive a secondary serving cell addition request message sent by a primary base station, where the secondary serving cell addition request message includes a serial number of a random access preamble code and a serial number of a physical random access channel mask code. The ninth unit 132A is configured to receive, according to the secondary serving cell addition request message, a random access request message that is sent by a terminal and carries the random access preamble code. The tenth unit 133A is configured to obtain a time advance command TAC according to the random access request message, and send, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

Further, according to the foregoing secondary base station, the time advance command TAC transmission message includes a first time at which the secondary base station receives the random access request message, so that the primary base station determines, according to the first time, a second time for sending the random access response message.

Figure 10:
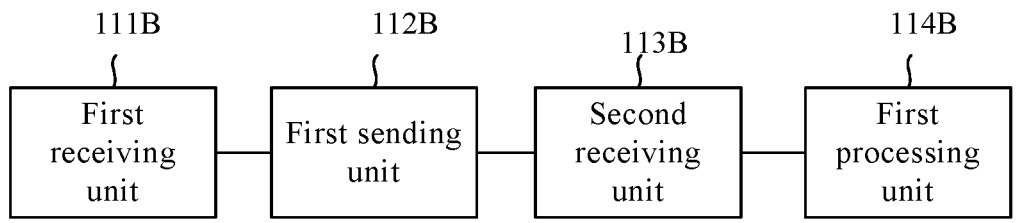
FIG. 10 is a schematic structural diagram 1 of a device embodiment for adding a secondary serving cell according to the present invention.

An embodiment of the present invention provides a terminal device. FIG. 10 is a schematic structural diagram 1 of a device embodiment for adding a secondary serving cell according to the present invention. As shown in FIG. 10, the terminal device includes a first receiving unit 111B, a first sending unit 112B, a second receiving unit 113B, and a first processing unit 114B. The first receiving unit 111B is configured to receive a random access resource allocation message sent by a primary base station, where the random access resource allocation message includes a serial number of a random access preamble code and a serial number of a physical random access channel mask code. The first sending unit 112B is configured to send a random access request message to a secondary base station by using a sending resource that is determined according to the serial number of the physical random access channel mask code, where the random access request message includes the random access preamble code that is determined according to the serial number of the random access preamble code. The second receiving unit 113B is configured to receive a random access response message sent by the primary base station, where the random access response message includes a time advance command TAC that is sent by the secondary base station to the primary base station and is determined by the secondary base station according to the random access request message. The first processing unit 114B is configured to adjust, according to the TAC, time advance TA of the terminal on a secondary serving cell corresponding to the secondary base station.

Figure 11:
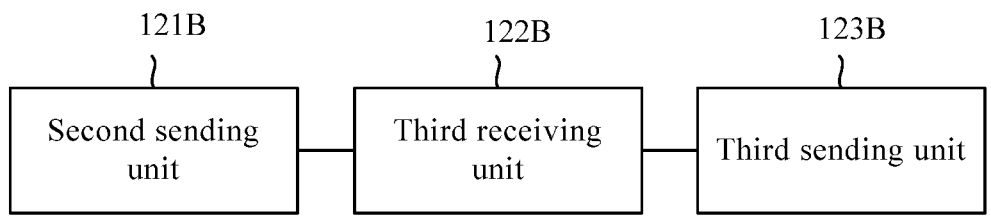
FIG. 11 is a schematic structural diagram 2 of a device embodiment for adding a secondary serving cell according to the present invention.

An embodiment of the present invention provides a primary base station device. FIG. 11 is a schematic structural diagram 2 of a device embodiment for adding a secondary serving cell according to the present invention. As shown in FIG. 11, the primary base station device includes a second sending unit 121B, a third receiving unit 122B, and a third sending unit 123B. The second sending unit 121B is configured to send a random access resource allocation message and a secondary serving cell addition request message to a terminal and a secondary base station, respectively, where both the random access resource allocation message and the secondary serving cell addition request message include a serial number of a random access preamble code and a serial number of a physical random access channel mask code. The third receiving unit 122B is configured to receive a time advance command TAC transmission message sent by the secondary base station, where the TAC transmission message is sent to the primary base station after the secondary base station receives a random access request message that is sent by the terminal and carries the random access preamble code obtained according to the serial number of the random access preamble code; and the TAC transmission message includes a TAC obtained by the secondary base station according to the random access request message. The third sending unit 123B is configured to send, to the terminal, a random access response message that carries the TAC, so that the terminal adjusts, according to the TAC, time advance TA of the terminal on a secondary serving cell corresponding to the secondary base station.

Further, according to the foregoing primary base station device, the time advance command TAC transmission message further includes a first time at which the secondary base station receives the random access request message.

Correspondingly, the third sending unit is further configured to determine, according to the first time, a second time for sending the random access response message.

Figure 12:
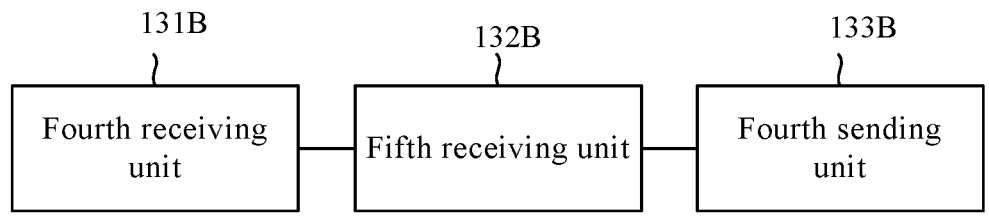
FIG. 12 is a schematic structural diagram 3 of a device embodiment for adding a secondary serving cell according to the present invention.

An embodiment of the present invention provides a secondary base station device. FIG. 12 is a schematic structural diagram 3 of a device embodiment for adding a secondary serving cell according to the present invention. As shown in FIG. 12, the secondary base station device includes a fourth receiving unit 131B, a fifth receiving unit 132B, and a fourth sending unit 133B. The fourth receiving unit 131B is configured to receive a secondary serving cell addition request message sent by a primary base station, where the secondary serving cell addition request message includes a serial number of a random access preamble code and a serial number of a physical random access channel mask code. The fifth receiving unit 132B is configured to receive, according to the secondary serving cell addition request message, a random access request message that is sent by a terminal and carries the random access preamble code. The fourth sending unit 133B is configured to obtain a time advance command TAC according to the random access request message, and send, to the primary base station, a time advance command TAC transmission message that carries the TAC, so that the primary base station sends, to the terminal, a random access response message that carries the TAC so that the terminal adjusts, according to the TAC, time advance TA of the terminal on a secondary serving cell corresponding to the secondary base station.

Further, according to the foregoing secondary base station device, the time advance command TAC transmission message further includes a first time at which the secondary base station receives the random access request message, so that the primary base station determines, according to the first time, a second time for sending the random access response message.

Figure 13:
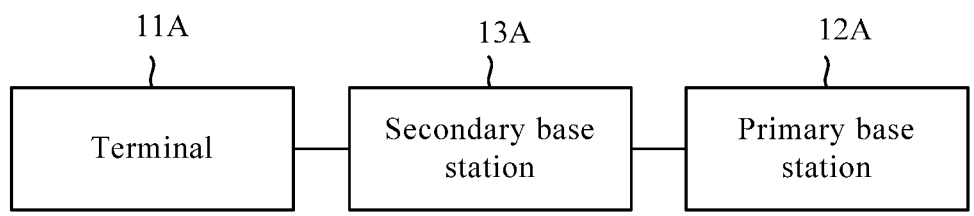
FIG. 13 is a schematic structural diagram 1 of an embodiment of a network system according to the present invention.

FIG. 13 is a schematic structural diagram 1 of an embodiment of a network system according to the present invention. As shown in FIG. 13, the system includes a terminal 11A, a primary base station 12A, and a secondary base station 13A. The terminal 11A receives a cell radio network temporary identifier of the terminal sent by the primary base station 12A, uses the cell radio network temporary identifier to descramble a subsequently received random access resource allocation message, and sends a random access request message to the secondary base station 13A according to a descrambled random access resource allocation message. Then, the terminal 11A receives a random access response message sent by the primary base station 12A, and adjusts, according to the random access response message received by the terminal 11A, time advance TA of the terminal 11A on a corresponding cell. The primary base station 12A sends a secondary serving cell addition request message to the secondary base station 13A. Before sending the random access resource allocation message to the terminal 11A, the primary base station 12A further sends the cell radio network temporary identifier of the terminal to the terminal, the primary base station scrambles the random access resource allocation message according to the cell radio network temporary identifier and sends a scrambled random access resource allocation message to the terminal again, and the primary base station 12A sends the random access response message to the terminal 11A according to the received time advance command transmission message. The secondary base station 13A receives the secondary serving cell addition request message sent by the primary base station 12A, and the secondary base station 13A sends the time advance command TAC transmission message to the primary base station 12A according to the received random access request message.

Figure 14:
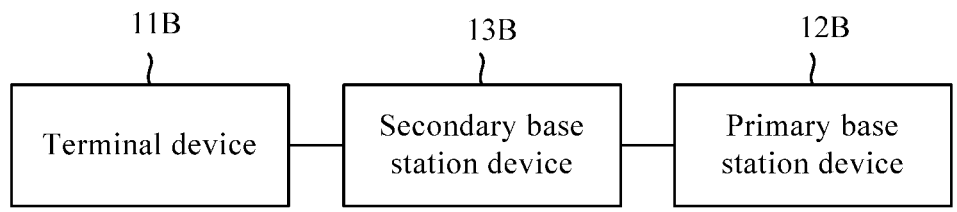
FIG. 14 is a schematic structural diagram 2 of an embodiment of a network system according to the present invention.

FIG. 14 is a schematic structural diagram 2 of an embodiment of a network system according to the present invention. As shown in FIG. 14, the system includes a terminal device 11B, a primary base station device 12B, and a secondary base station device 13B. The devices are configured to correspondingly execute the technical solution of the apparatus embodiment shown in FIG. 13. A principle and a technical effect thereof are similar, and details are not described herein again.

Figure 15:
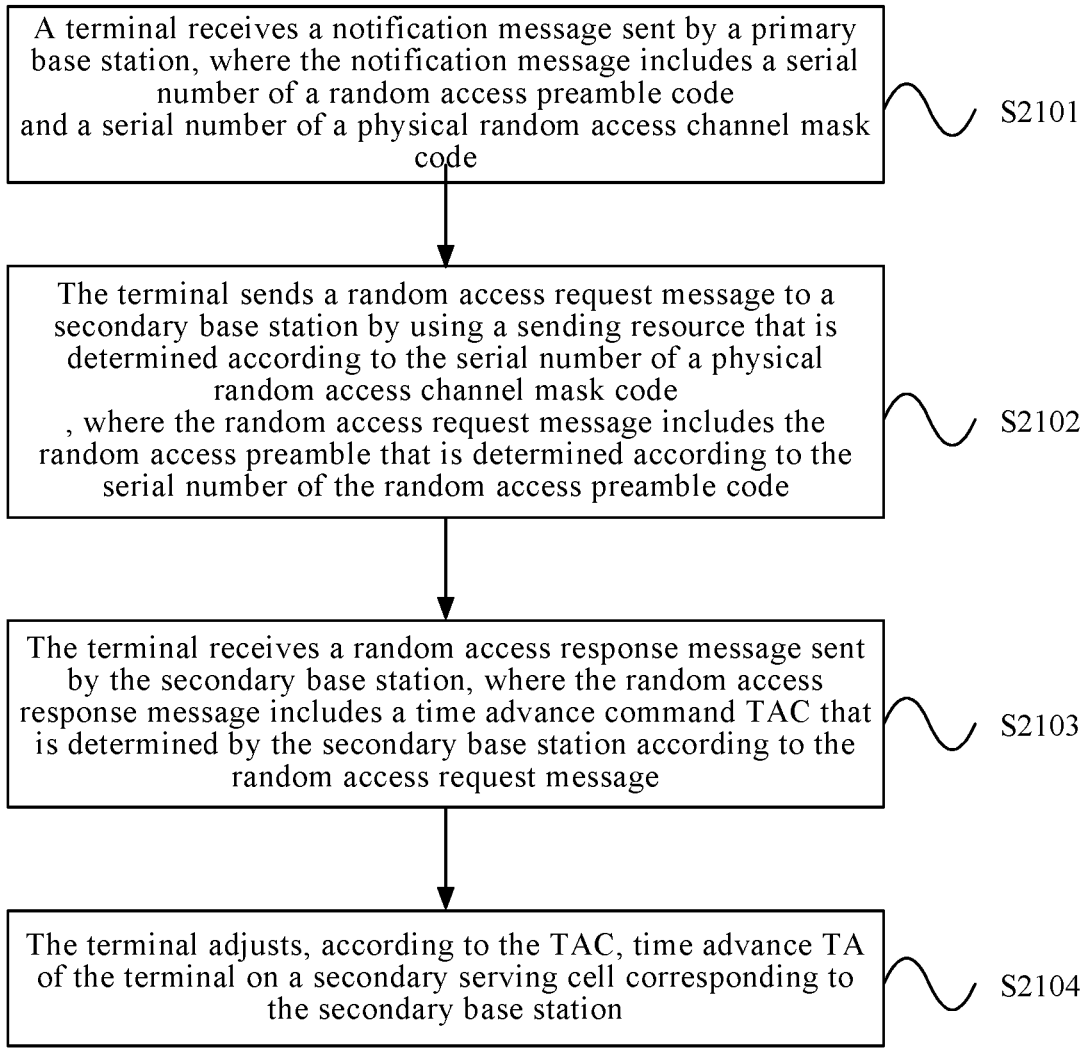
FIG. 15 is a schematic flowchart 4 of an embodiment of a method for adding a secondary serving cell according to the present invention.

FIG. 15 is a schematic flowchart 4 of an embodiment of a method for adding a secondary serving cell according to the present invention. The method applies to a terminal, and includes the following steps:

Step 2101: The terminal receives a notification message sent by a primary base station, where the notification message includes a serial number of a random access preamble code and a serial number of a physical random access channel mask code.

Specifically, the terminal receives the serial number of the random access preamble code and the serial number of the PRACH mask code sent by the primary base station.

Step 2102: The terminal sends a random access request message to a secondary base station by using a sending resource that is determined according to the serial number of the physical random access channel mask code, where the random access request message includes the random access preamble code that is determined according to the serial number of the random access preamble code.

Specifically, the terminal determines, according to the received serial number of the PRACH mask code, the resource for sending the random access request message to the secondary base station. The terminal further determines, according to the received serial number of the random access preamble code, the random access preamble code sent to the secondary base station.

Step 2103: The terminal receives a random access response message sent by the secondary base station, where the random access response message includes a time advance command TAC that is determined by the secondary base station according to the random access request message.

Specifically, the terminal receives the time advance command TAC sent by the secondary base station, where the time advance command TAC is determined by the secondary base station according to the received random access request message.

Step 2104: The terminal adjusts, according to the TAC, time advance TA of the terminal on a secondary serving cell corresponding to the secondary base station.

Specifically, the terminal adjusts, according to the time advance command TAC sent by the secondary base station, the time advance TA of the terminal on the corresponding cell.

Further, according to the terminal in the foregoing method for adding a secondary serving cell, the notification message may be a reconfiguration message, and the reconfiguration message further includes a random access response window size, of the secondary serving cell, that is used by the terminal to receive the random access response message. The notification message may also be a random access resource allocation message. When the notification message is a random access resource allocation message, the terminal may further receive a reconfiguration message sent by the primary base station, where the reconfiguration message includes a random access response window size, of the secondary serving cell, that is used by the terminal to receive the random access response message.

Specifically, in addition to receiving the serial number of the random access preamble code and the serial number of the PRACH mask code sent by the primary base station, the terminal further receives a response window size sent by the primary base station, and the terminal determines, according to the response window size, a time window for receiving the random access response message. The terminal may receive, in one step, the response window size, the serial number of the random access preamble code, and the serial number of the PRACH mask code sent by the primary base station, or may receive, in two steps, the response window size, the serial number of the random access preamble code, and the serial number of the PRACH mask code sent by the primary base station. Specifically, when the notification message received by the terminal is a reconfiguration message, the notification message includes the following information: the serial number of the random access preamble code, the serial number of the PRACH mask code, and the random access response window size, of the secondary serving cell, that is used by the terminal to receive the random access response message, and is included in the reconfiguration message. When the notification message received by the terminal is a random access resource allocation message, the notification message includes the following information: the serial number of the random access preamble code and the serial number of the PRACH mask code. In addition, the notification message further includes a random access response window size used by the terminal to receive the random access response message, is of the secondary serving cell, and is included in the reconfiguration message.

Still further, according to the terminal in the foregoing method for adding a secondary serving cell, before the terminal receives the notification message sent by the primary base station, the terminal further receives a cell radio network temporary identifier of the terminal sent by the primary base station; and after receiving the notification message sent by the primary base station, the terminal uses the cell radio network temporary identifier of the terminal to perform descrambling, to obtain the serial number of the random access preamble code and the serial number of the physical random access channel mask code.

Specifically, before the terminal receives the serial number of the random access preamble code and the serial number of the PRACH mask code sent by the primary base station, the terminal further receives the cell radio network temporary identifier of the terminal sent by the primary base station, and the terminal uses the cell radio network temporary identifier to descramble the received random access resource allocation message, to obtain the serial number of the random access preamble code and the serial number of the physical random access channel mask code.

Figure 16:
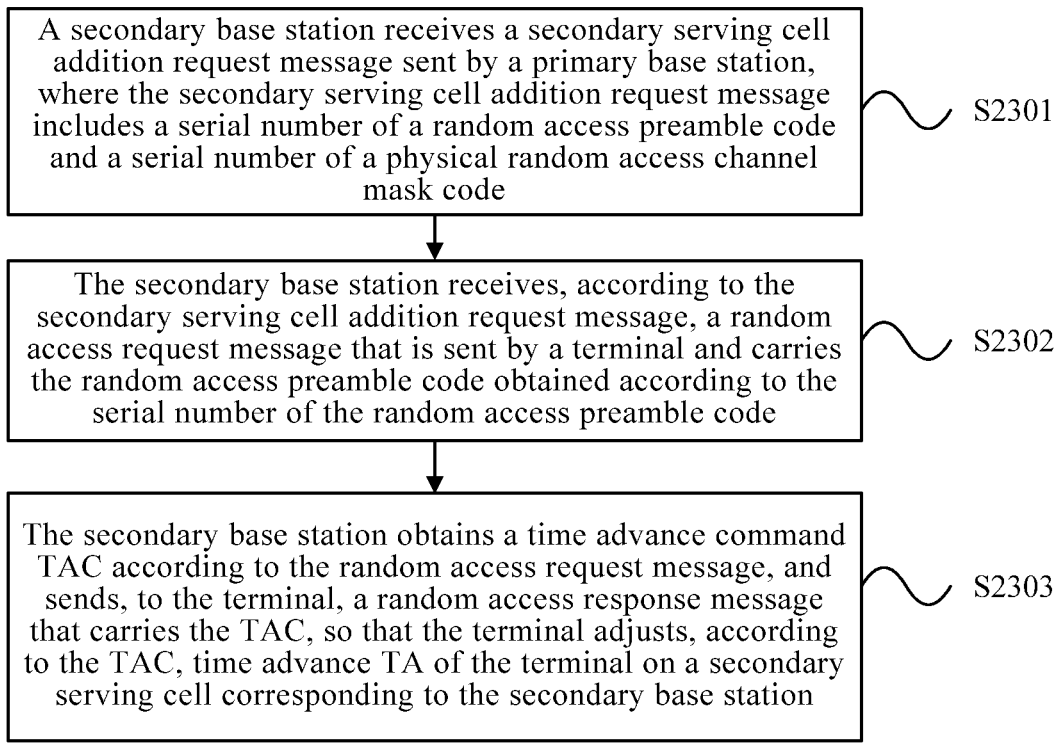
FIG. 16 is a schematic flowchart 5 of an embodiment of a method for adding a secondary serving cell according to the present invention.

FIG. 16 is a schematic flowchart 5 of an embodiment of a method for adding a secondary serving cell according to the present invention. The method applies to a secondary base station, and includes the following steps:

Step 2301: The secondary base station receives a secondary serving cell addition request message sent by a primary base station, where the secondary serving cell addition request message includes a serial number of a random access preamble code and a serial number of a physical random access channel mask code.

Specifically, the secondary base station receives the serial number of the random access preamble code and the serial number of the physical random access channel mask code sent by the primary base station.

Step 2302: The secondary base station receives, according to the secondary serving cell addition request message, a random access request message that is sent by a terminal and carries the random access preamble code obtained according to the serial number of the random access preamble code.

Specifically, the secondary base station receives, according to the serial number of the random access preamble code and the serial number of the physical random access channel mask code sent by the primary base station, the random access request message sent by the terminal, where the random access preamble code included in the random access request message is determined by the serial number of the random access preamble code.

Step 2303: The secondary base station obtains a time advance command TAC according to the random access request message, and sends, to the terminal, a random access response message that carries the TAC, so that the terminal adjusts, according to the TAC, time advance TA of the terminal on a secondary serving cell corresponding to the secondary base station.

Specifically, the secondary base station determines the time advance command TAC according to the received random access request message, and sends the time advance command TAC to the terminal. The terminal adjusts, according to the TAC, time advance TA of the terminal on a corresponding cell.

Figure 17:
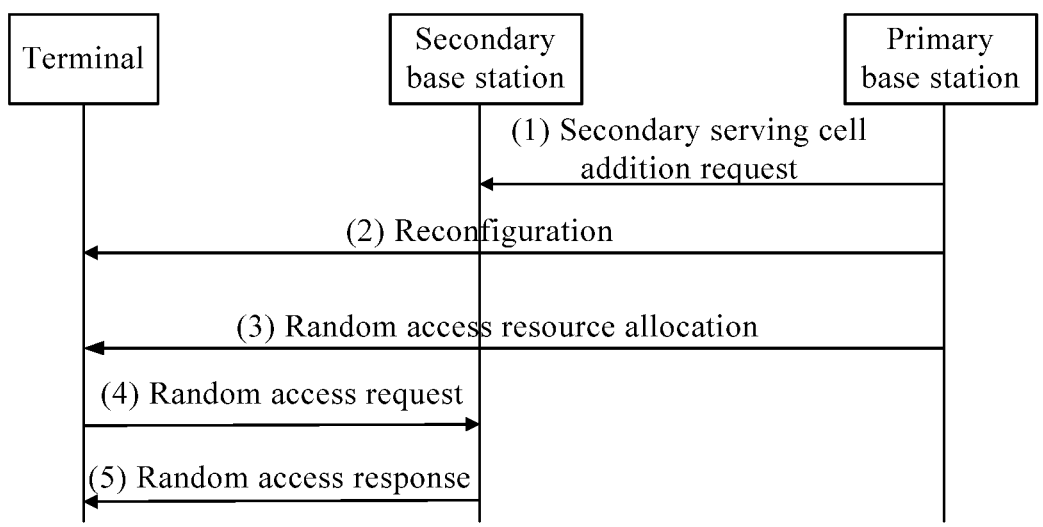
FIG. 17 is a schematic signaling diagram of a second embodiment of a network system according to the present invention.

FIG. 17 is a schematic signaling diagram of a second embodiment of a network system according to the present invention. As shown in FIG. 17, transmission of the signaling is divided into five steps. Step 1: A primary base station sends a secondary serving cell addition request message to a secondary base station, where the secondary serving cell addition request message includes a serial number of a random access preamble code and a serial number of a PRACH mask code. Step 2: The primary base station sends a reconfiguration message to a terminal, where the reconfiguration message includes a response window size. Step 3: The primary base station sends a random access resource allocation message to the terminal, where the random access resource allocation message includes a serial number of a random access preamble code and a serial number of a PRACH mask code. Step 4: The terminal sends a random access request message to the secondary base station according to the received random access resource allocation message, where the random access request message includes a random access preamble code. Step 5: The secondary base station sends a random access response message to the terminal according to the received random access request message, where the random access response message includes a time advance command TAC, so that the terminal adjusts, according to the time advance command TAC, time advance TA of the terminal on a corresponding cell, where the terminal determines, according to the response window size included in the received reconfiguration message, a time window for receiving the random access response message to receive the random access response message. Step 2 is optional. When step 2 is skipped, the terminal uses a default time window to receive the random access response message. In addition, before the terminal receives the random access resource allocation message sent by the primary base station, the terminal further receives a cell radio network temporary identifier of the terminal sent by a the primary base station, so that the primary base station uses the cell radio network temporary identifier to scramble the random access resource allocation message and then sends a scrambled random access resource allocation message to the terminal, and so that the terminal uses the cell radio network temporary identifier to descramble a subsequently received random access resource allocation message, where the cell radio network temporary identifier is allocated by the primary base station to the terminal in advance.

According to the method for adding a secondary serving cell, the apparatus, the device, and the network system that are provided in the embodiments of the present invention, a primary base station sends a secondary serving cell addition request message to a secondary base station, so that the secondary base station can correctly receive, in a subsequent step, a random access request message sent by a terminal, and determine content of a random access response message and a time for sending the message to the terminal. According to the embodiments of the present invention, a primary serving cell and a secondary serving cell can still work properly in a case in which the primary serving cell and the secondary serving cell belong to different base stations, or when a delay over a connection between the primary serving cell and the secondary serving cell is relatively long and a capacity is relatively small.

Figure 18:
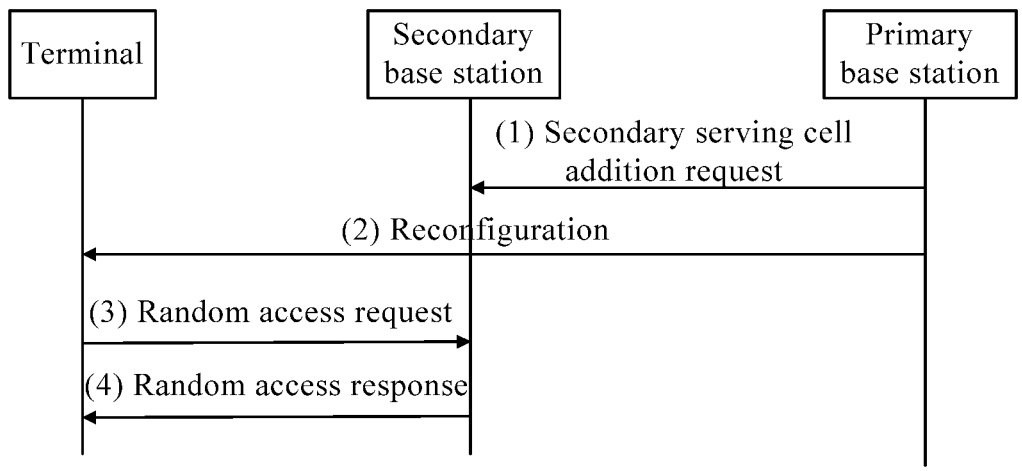
FIG. 18 is a schematic signaling diagram of a third embodiment of a network system according to the present invention.

FIG. 18 is a schematic diagram of signaling of a third embodiment of a network system according to the present invention. As shown in FIG. 18, transmission of the signaling is divided into four steps. Step 1: A primary base station sends a secondary serving cell addition request message to a secondary base station, where the secondary serving cell addition request message includes a serial number of a random access preamble code and a serial number of a PRACH mask code. Step 2: The primary base station sends a reconfiguration message to a terminal, where the reconfiguration message includes a serial number of a random access preamble code and a serial number of a PRACH mask code, and optionally, the reconfiguration message further includes a response window size. Steps 3 and 4 are the same as steps 4 and 5 in the schematic signaling diagram of the second embodiment, and details are not described herein again. When the response window size is not included in the reconfiguration message, the terminal uses a default time window to receive a random access response message. In addition, before the terminal receives the reconfiguration message sent by the primary base station, the terminal further receives a cell radio network temporary identifier of the terminal sent by the primary base station, so that the primary base station uses the cell radio network temporary identifier to scramble a random access resource allocation message and then sends a scrambled random access resource allocation message to the terminal, so that the terminal uses the cell radio network temporary identifier to descramble a subsequently received random access resource allocation message. That is, the cell radio network temporary identifier is allocated by the primary base station to the terminal in advance.

According to the method for adding a secondary serving cell, the apparatus, the device, and the network system that are provided in the embodiments of the present invention, a primary base station sends a secondary serving cell addition request message to a secondary base station, so that the secondary base station can correctly receive, in a subsequent step, a random access request message sent by a terminal, and then determine content of a random access response message and a time for sending the message to the terminal. According to the embodiments of the present invention, a primary serving cell and a secondary serving cell can still work properly when the primary serving cell and the secondary serving cell belong to different base stations, or a connection delay between the primary serving cell and the secondary serving cell is relatively long and a capacity is relatively small.

Figure 19:
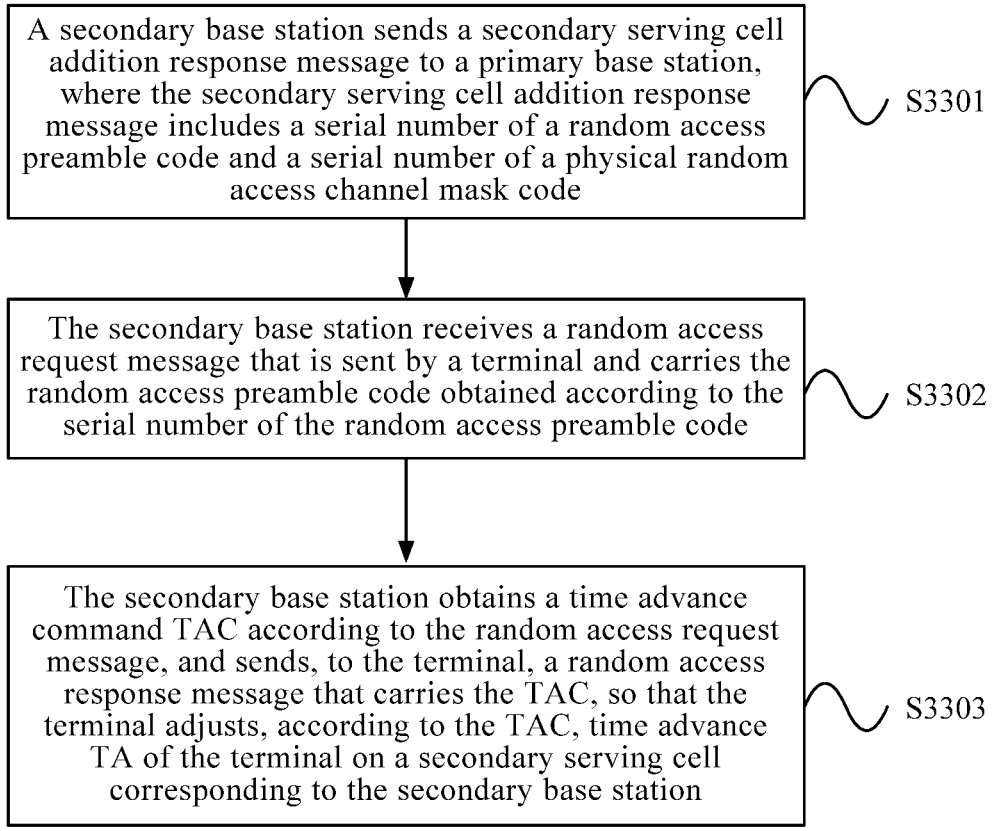
FIG. 19 is a schematic flowchart 6 of an embodiment of a method for adding a secondary serving cell according to the present invention.

FIG. 19 is a schematic flowchart 6 of an embodiment of a method for adding a secondary serving cell according to the present invention. The method applies to a secondary base station, and includes the following steps:

Step 3301: The secondary base station sends a secondary serving cell addition response message to a primary base station, where the secondary serving cell addition response message includes a serial number of a random access preamble code and a serial number of a physical random access channel mask code.

Specifically, the secondary base station sends the serial number of the random access preamble code and the serial number of the physical random access channel mask code to the primary base station.

Step 3302: The secondary base station receives a random access request message that is sent by a terminal and carries the random access preamble code obtained according to the serial number of the random access preamble code.

Specifically, the secondary base station receives, according to the serial number of the random access preamble code and the serial number of the PRACH mask code that are sent to the primary base station and then are sent by the primary base station to the terminal, the random access request message sent by the terminal, where the random access preamble code carried in the random access request message is determined by the serial number of the random access preamble code.

Step 3303: The secondary base station obtains a time advance command TAC according to the random access request message, and sends, to the terminal, a random access response message that carries the TAC, so that the terminal adjusts, according to the TAC, time advance TA of the terminal on a secondary serving cell corresponding to the secondary base station.

Specifically, this step is the same as step 2303, and details are not described herein again.

Further, according to the secondary base station in the foregoing method for adding a secondary serving cell, the secondary serving cell addition response message further includes a random access response window size, of the secondary serving cell, that is used by the terminal to receive the random access response message.

Specifically, in step 3301, in addition to the serial number of the random access preamble code and the serial number of the PRACH mask code, the secondary serving cell addition response message sent by the secondary base station to the primary base station further includes a response window size, and the terminal determines, according to the response window size, a time window for receiving the random access response message.

Figure 20:
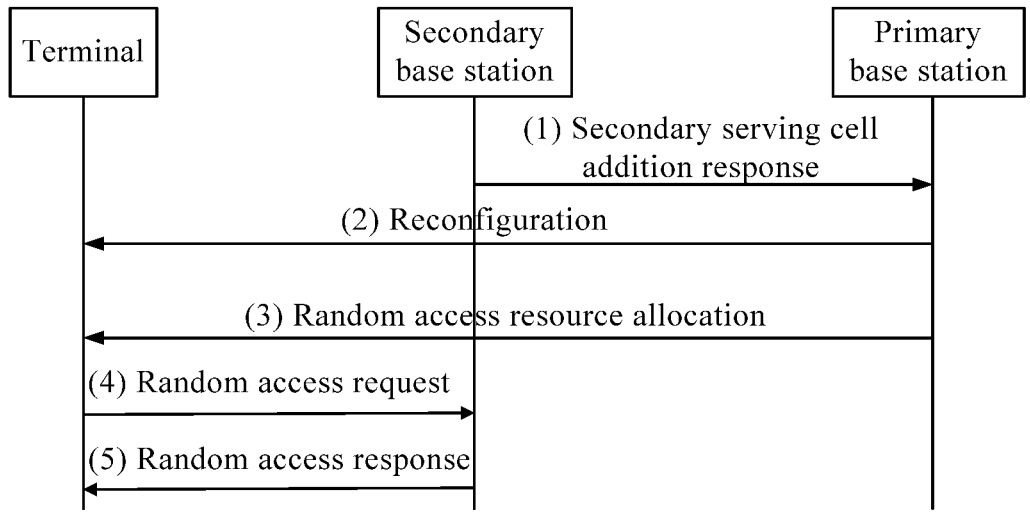
FIG. 20 is a schematic signaling diagram of a fourth embodiment of a network system according to the present invention.

FIG. 20 is a schematic signaling diagram of a fourth embodiment of a network system according to the present invention. As shown in FIG. 20, transmission of the signaling is divided into five steps. Step 1: A secondary base station sends a secondary serving cell addition response message to a primary base station, where the secondary serving cell addition response message includes a serial number of a random access preamble code and a serial number of a PRACH mask code. Optionally, the secondary serving cell addition response message further includes a response window size. Steps 2, 3, 4, and 5 are the same as the steps in the schematic signaling diagram of the second embodiment, and details are not described herein again. By comparing the schematic signaling diagram of the fourth embodiment with the schematic signaling diagram of the second embodiment, it is found that the serial number of the random access preamble code, the serial number of the PRACH mask code, and the response window size (optional) in the schematic signaling diagram of the fourth embodiment are determined by the secondary base station, and the serial number of the random access preamble code, the serial number of the PRACH mask code, and the response window size (optional) in the schematic signaling diagram of the second embodiment, however, are determined by the primary base station. In addition, step 2 is optional. When step 2 is skipped, the terminal uses a default time window to receive a random access response message. Before the terminal receives the random access resource allocation message sent by the primary base station, the terminal further receives a cell radio network temporary identifier of the terminal sent by a host, so that the primary base station uses the cell radio network temporary identifier to scramble the random access resource allocation message and then sends a scrambled random access resource allocation message to the terminal, so that the terminal uses the cell radio network temporary identifier to descramble a subsequently received random access resource allocation message. That is, the cell radio network temporary identifier is allocated by the primary base station to the terminal in advance.

According to the method for adding a secondary serving cell, the apparatus, the device, and the network system that are provided in the embodiments of the present invention, a secondary base station sends a secondary serving cell addition response message to a primary base station, so that after the primary base station sends a random access resource allocation message to a terminal, it is ensured that the secondary base station can correctly receive a random access request message sent by the terminal, and the secondary base station then can determine, according to the random access request message, content of a random access response message and a time for sending the message to the terminal. According to the embodiments of the present invention, a primary serving cell and a secondary serving cell can still work properly in a case in which the primary serving cell and the secondary serving cell belong to different base stations, or when a delay over a connection between the primary serving cell and the secondary serving cell is relatively long and a capacity is relatively small.

Figure 21:
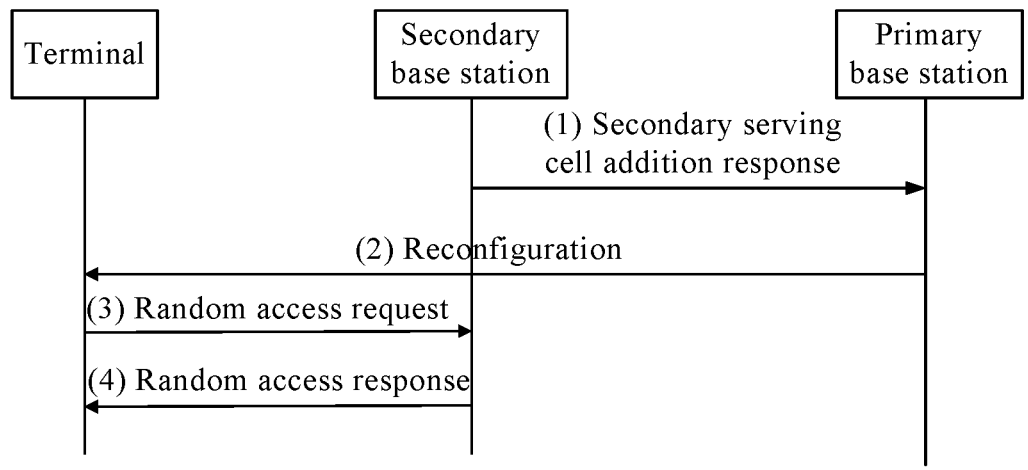
FIG. 21 is a schematic signaling diagram of a fifth embodiment of a network system according to the present invention.

FIG. 21 is a schematic signaling diagram of a fifth embodiment of a network system according to the present invention. As shown in FIG. 21, transmission of the signaling is divided into four steps. Step 1: A secondary base station sends a secondary serving cell addition response message to a primary base station, where the secondary serving cell addition response message includes a serial number of a random access preamble code and a serial number of a PRACH mask code. Optionally, the secondary serving cell addition response message further includes a response window size. Steps 2, 3, and 4 are the same as the steps in the schematic signaling diagram of the third embodiment, and details are not described herein again. By comparing the schematic signaling diagram of the fifth embodiment with the schematic signaling diagram of the third embodiment, it is found that the serial number of the random access preamble code, the serial number of the PRACH mask code, and the response window size (optional) in the schematic signaling diagram of the fifth embodiment are determined by the secondary base station, and the serial number of the random access preamble code, the serial number of the PRACH mask code, and the response window size (optional) in the schematic signaling diagram of the third embodiment, however, are determined by the primary base station. When the response window size is not included in the reconfiguration message, the terminal uses a default time window to receive the random access response message. In addition, before the terminal receives the reconfiguration message sent by the primary base station, the terminal further receives a cell radio network temporary identifier of the terminal sent by the primary base station, so that the primary base station uses the cell radio network temporary identifier to scramble a random access resource allocation message and then sends a scrambled random access resource allocation message to the terminal, so that the terminal uses the cell radio network temporary identifier to descramble a subsequently received random access resource allocation message. That is, the cell radio network temporary identifier is allocated by the primary base station to the terminal in advance.

According to the method for adding a secondary serving cell, the apparatus, the device, and the network system that are provided in the embodiments of the present invention, a secondary base station sends a secondary serving cell addition response message to a primary base station, so that after the primary base station sends a reconfiguration message to a terminal, it is ensured that the secondary base station can correctly receive a random access request message sent by the terminal, and the secondary base station then can determine, according to the random access request message, content of a random access response message and a time for sending the message to the terminal. According to the embodiments of the present invention, a primary serving cell and a secondary serving cell can still work properly in a case in which the primary serving cell and the secondary serving cell belong to different base stations, or when a delay over a connection between the primary serving cell and the secondary serving cell is relatively long and a capacity is relatively small.

Figure 22:
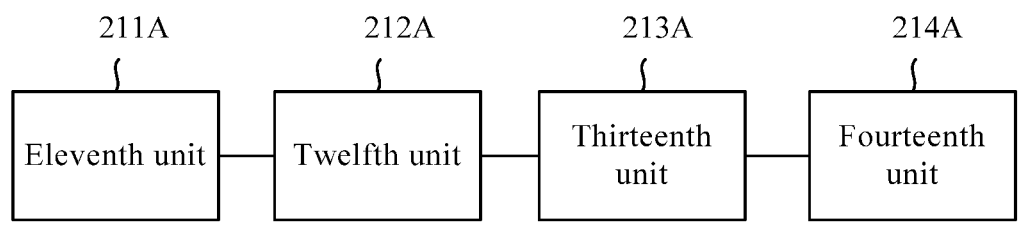
FIG. 22 is a schematic structural diagram 4 of an apparatus embodiment for adding a secondary serving cell according to the present invention.

FIG. 22 is a schematic structural diagram 4 of an apparatus embodiment for adding a secondary serving cell according to the present invention. As shown in FIG. 22, the terminal includes an eleventh unit 211A, a twelfth unit 212A, a thirteenth unit 213A, and a fourteenth unit 214A. The eleventh unit 211A is configured to receive a notification message sent by a primary base station, where the notification message includes a serial number of a random access preamble code and a serial number of a physical random access channel mask code. The twelfth unit 212A is configured to send a random access request message to a secondary base station by using a sending resource that is determined according to the serial number of the physical random access channel mask code, where the random access request message includes the random access preamble code that is determined according to the serial number of the random access preamble code. The thirteenth unit 213A is configured to receive a random access response message sent by the secondary base station, where the random access response message includes a time advance command TAC that is determined by the secondary base station according to the random access request message. The fourteenth unit 214A is configured to adjust, according to the TAC, time advance TA of the terminal on a secondary serving cell corresponding to the secondary base station.

According to the foregoing apparatus for adding a secondary serving cell, the eleventh unit 211A receives the notification message sent by the primary base station, and the notification message is a reconfiguration message or a random access resource allocation message. When the notification message is a random access resource allocation message, the terminal further receives a reconfiguration message sent by the primary base station; and correspondingly, the reconfiguration message further includes a random access response window size, of the secondary serving cell, that is used by the terminal to receive the random access response message.

Further, before the eleventh unit 211A receives the notification message, the terminal further receives a cell radio network temporary identifier of the terminal sent by the primary base station; and after receiving the notification message sent by the primary base station, the terminal uses the cell radio network temporary identifier of the terminal to perform descrambling, to obtain the serial number of the random access preamble code and the serial number of the physical random access channel mask code.

Figure 23:
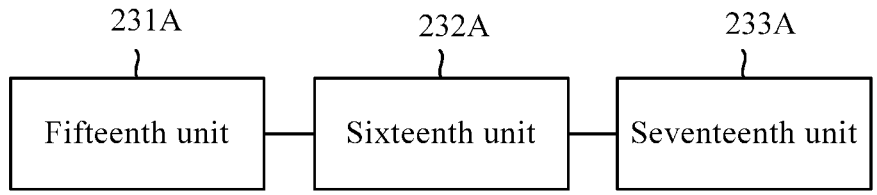
FIG. 23 is a schematic structural diagram 5 of an apparatus embodiment for adding a secondary serving cell according to the present invention.

FIG. 23 is a schematic structural diagram 5 of an apparatus embodiment for adding a secondary serving cell according to the present invention. As shown in FIG. 23, a secondary base station includes a fifteenth unit 231A, a sixteenth unit 232A, and a seventeenth unit 233A. The fifteenth unit 231A is configured to receive a secondary serving cell addition request message sent by a primary base station, where the secondary serving cell addition request message includes a serial number of a random access preamble code and a serial number of a physical random access channel mask code. The sixteenth unit 232A is configured to receive, according to the secondary serving cell addition request message, a random access request message that is sent by a terminal and carries the random access preamble code obtained according to the serial number of the random access preamble code. The seventeenth unit 233A is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Figure 24:
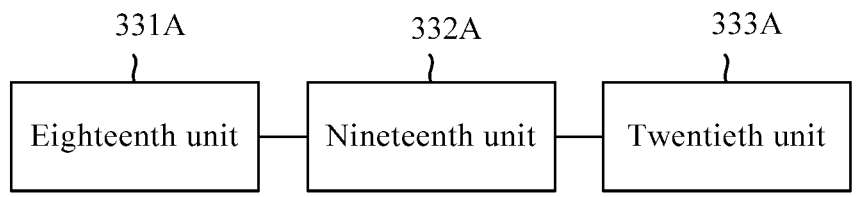
FIG. 24 is a schematic structural diagram 6 of an apparatus embodiment for adding a secondary serving cell according to the present invention.

FIG. 24 is a schematic structural diagram 6 of an apparatus embodiment for adding a secondary serving cell according to the present invention. As shown in FIG. 24, a secondary base station includes an eighteenth unit 331A, a nineteenth unit 332A, and a twentieth unit 333A. The eighteenth unit 331A is configured to send a secondary serving cell addition response message to a primary base station, where the secondary serving cell addition response message includes a serial number of a random access preamble code and a serial number of a physical random access channel mask code. The nineteenth unit 332A is configured to receive a random access request message that is sent by a terminal and carries the random access preamble code obtained according to the serial number of the random access preamble code. The twentieth unit 333A is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition response message sent by the eighteenth unit 331A further includes a random access response window size, of the secondary serving cell, that is used for the terminal to receive the random access response message.

Figure 25:
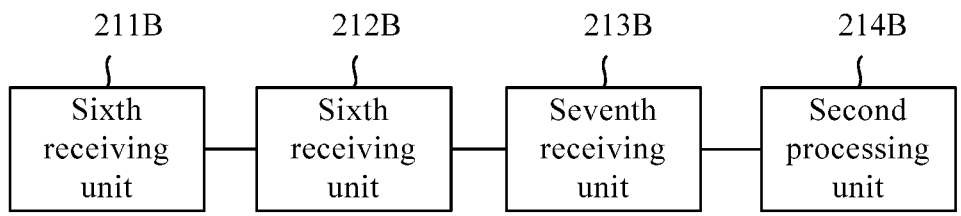
FIG. 25 is a schematic structural diagram 4 of a device embodiment for adding a secondary serving cell according to the present invention.

An embodiment of the present invention provides a terminal device. FIG. 25 is a schematic structural diagram 4 of a device embodiment for adding a secondary serving cell according to the present invention. As shown in FIG. 25, the terminal device includes a sixth receiving unit 211B, a fifth sending unit 212B, a seventh receiving unit 213B, and a second processing unit 214B. The sixth receiving unit 211B is configured to receive a notification message sent by a primary base station, where the notification message includes a serial number of a random access preamble code and a serial number of a physical random access channel mask code. The fifth sending unit 212B is configured to send a random access request message to a secondary base station by using a sending resource that is determined according to the serial number of the physical random access channel mask code, where the random access request message includes the random access preamble code that is determined according to the serial number of the random access preamble code. The seventh receiving unit 213B is configured to receive a random access response message sent by the secondary base station, where the random access response message includes a time advance command TAC that is determined by the secondary base station according to the random access request message. The second processing unit 214B is configured to adjust, according to the TAC, time advance TA of the terminal on a secondary serving cell corresponding to the secondary base station.

According to the foregoing terminal device, the notification message is a reconfiguration message or a random access resource allocation message; when the notification message is a random access resource allocation message, a terminal device further receives a reconfiguration message sent by the primary base station; and correspondingly, the reconfiguration message further includes a random access response window size, of the secondary serving cell, that is used by the terminal to receive the random access response message.

According to the foregoing terminal device, before the terminal receives the notification message sent by the primary base station, the terminal further receives a cell radio network temporary identifier sent by the primary base station; and after the terminal receives the notification message sent by the primary base station, the terminal uses the cell radio network temporary identifier to perform descrambling, to obtain the serial number of the random access preamble code and the serial number of the physical random access channel mask code.

Figure 26:
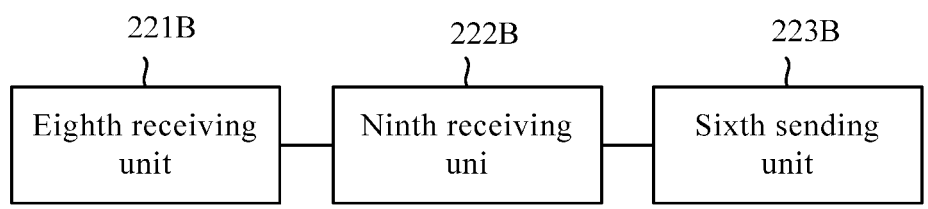
FIG. 26 is a schematic structural diagram 5 of a device embodiment for adding a secondary serving cell according to the present invention.

FIG. 26 is a schematic structural diagram 5 of a device embodiment for adding a secondary serving cell according to the present invention. As shown in FIG. 26, a secondary base station device includes an eighth receiving unit 221B, a ninth receiving unit 222B, and a sixth sending unit 223B. The eighth receiving unit 221B is configured to receive a secondary serving cell addition request message sent by a primary base station, where the secondary serving cell addition request message includes a serial number of a random access preamble code and a serial number of a physical random access channel mask code. The ninth receiving unit 222B is configured to receive, according to the secondary serving cell addition request message, a random access request message that is sent by a terminal and carries the random access preamble code obtained according to the serial number of the random access preamble code. The sixth sending unit 223B is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Figure 27:
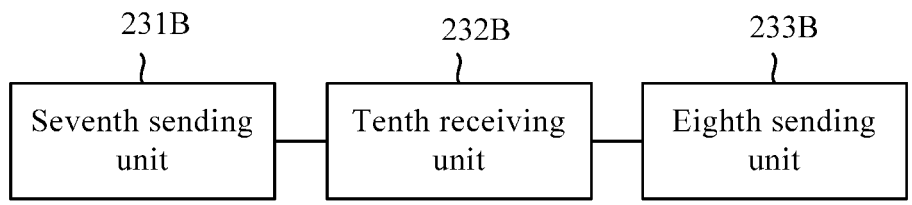
FIG. 27 is a schematic structural diagram 6 of a device embodiment for adding a secondary serving cell according to the present invention.

FIG. 27 is a schematic structural diagram 6 of a device embodiment for adding a secondary serving cell according to the present invention. As shown in FIG. 27, the secondary base station device includes a seventh sending unit 231B, a tenth receiving unit 232B, and an eighth sending unit 233B. The seventh sending unit 231B is configured to send a secondary serving cell addition response message to a primary base station, where the secondary serving cell addition response message includes a serial number of a random access preamble code and a serial number of a physical random access channel mask code. The tenth receiving unit 232B is configured to receive a random access request message that is sent by a terminal and carries the random access preamble code obtained according to the serial number of the random access preamble code. The eighth sending unit 233B is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition response message further includes a random access response window size, of the secondary serving cell, that is used by the terminal to receive the random access response message.

Figure 28:
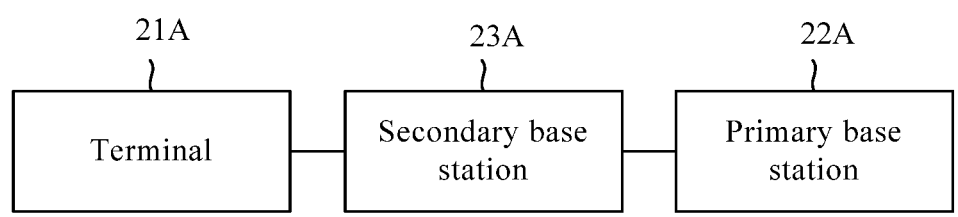
FIG. 28 is a schematic structural diagram 3 of an embodiment of a network system according to the present invention.

FIG. 28 is a schematic structural diagram 3 of an embodiment of a network system according to the present invention. As shown in FIG. 28, the network system includes a terminal 21A, a secondary base station 23A, and a primary base station 22A. The terminal 21A receives a notification message sent by the primary base station 22A, where the notification message is a reconfiguration message or a random access resource allocation message, then sends a random access request message to the secondary base station 23A according to the received notification message, and then adjusts, according to a received random access response message, time advance TA of the terminal 21A on a corresponding cell. The secondary base station 23A receives a secondary serving cell addition request message sent by the primary base station 22A or sends a secondary serving cell addition response message to the primary base station 22A, and the secondary base station 23A sends the random access response message to the terminal 21A according to the random access request message sent by the terminal 21A. The primary base station 22A sends the secondary serving cell addition request message to the secondary base station 23A or receives the secondary serving cell addition response message sent by the secondary base station 23A, and the secondary base station 23A sends, to the terminal 21A, the reconfiguration message, or the reconfiguration message and the random access resource allocation message.

Figure 29:
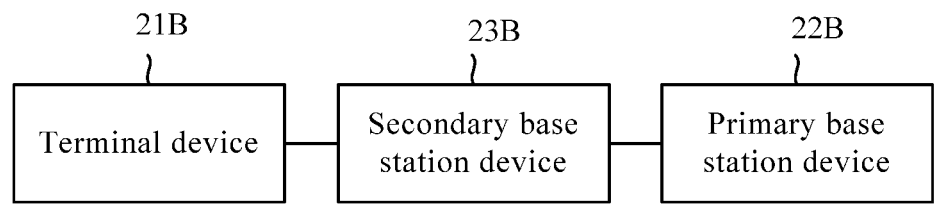
FIG. 29 is a schematic structural diagram 4 of an embodiment of a network system according to the present invention.

FIG. 29 is a schematic structural diagram 4 of an embodiment of a network system according to the present invention. As shown in FIG. 29, the system includes a terminal device 21B, a primary base station device 22B, and a secondary base station device 23B. The devices are configured to correspondingly execute the technical solution of the apparatus embodiment shown in FIG. 28. A principle and a technical effect thereof are similar, and details are not described herein again.

Figure 30:
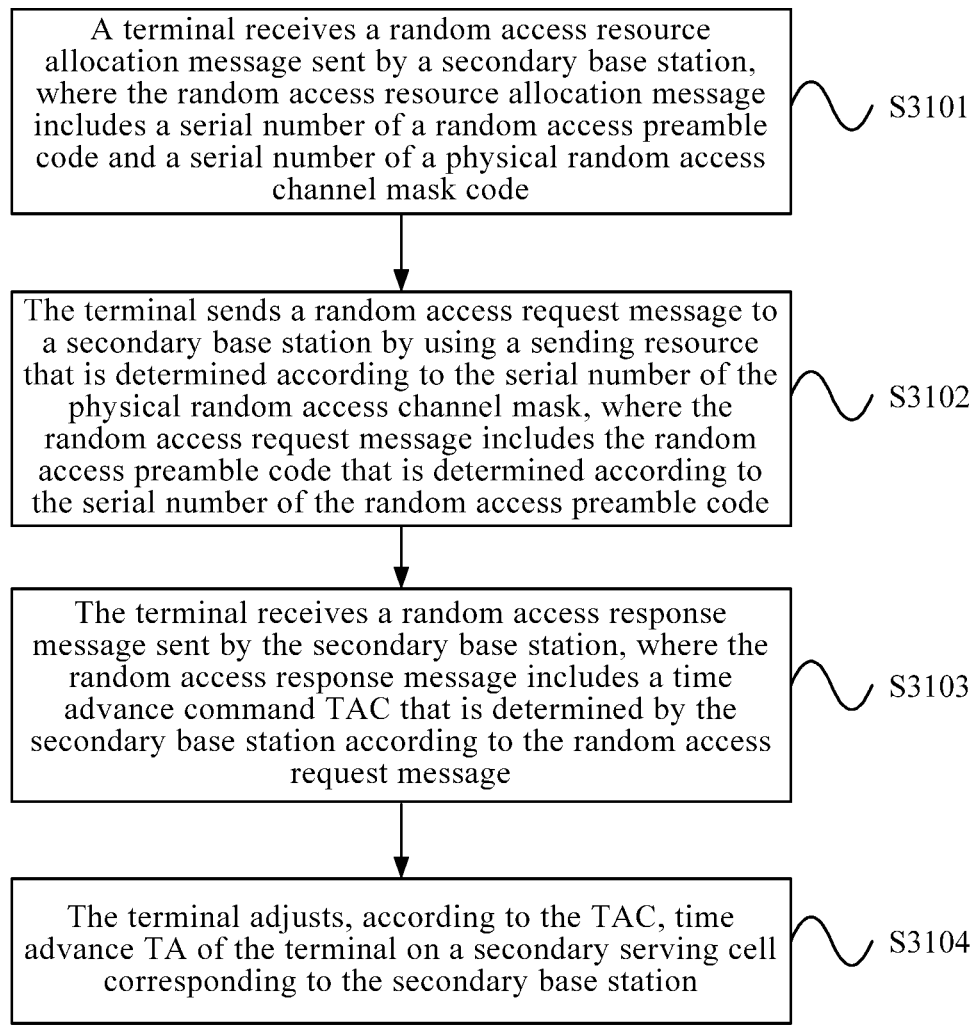
FIG. 30 is a schematic flowchart 7 of an embodiment of a method for adding a secondary serving cell according to the present invention.

FIG. 30 is a schematic flowchart 7 of an embodiment of a method for adding a secondary serving cell according to the present invention. The method applies to a terminal, and includes the following steps:

Step 3101: The terminal receives a random access resource allocation message sent by a secondary base station, where the random access resource allocation message includes a serial number of a random access preamble code and a serial number of a physical random access channel mask code.

Specifically, the terminal receives the serial number of the random access preamble code and the serial number of the physical random access channel mask code sent by the secondary base station.

Step 3102: The terminal sends a random access request message to a secondary base station by using a sending resource that is determined according to the serial number of a physical random access channel mask code, where the random access request message includes the random access preamble code that is determined according to the serial number of the random access preamble code.

Specifically, the terminal determines, according to the serial number of the PRACH mask code, the resource for sending the random access request message to the secondary base station. The terminal further determines, according to the received serial number of the random access preamble code, the random access preamble code sent to the secondary base station.

Step 3103: The terminal receives a random access response message sent by the secondary base station, where the random access response message includes a time advance command TAC that is determined by the secondary base station according to the random access request message.

Specifically, the terminal receives the time advance command TAC sent by the secondary base station, where the time advance command TAC is determined by the secondary base station according to the received random access request message.

Step 3104: The terminal adjusts, according to the TAC, time advance TA of the terminal on a secondary serving cell corresponding to the secondary base station.

Specifically, the terminal adjusts, according to the time advance command TAC sent by the secondary base station, the time advance TA of the terminal on the corresponding cell.

Further, according to the foregoing method for adding a secondary serving cell, before step 3101, the terminal further receives a cell radio network temporary identifier of the terminal sent by a primary base station, and the terminal uses the cell radio network temporary identifier to descramble a subsequently received random access resource allocation message. That is, the cell radio network temporary identifier is allocated by the primary base station to the terminal in advance.

Further, according to the terminal in the foregoing method for adding a secondary serving cell, the method further includes: receiving, by the terminal, a reconfiguration message sent by the primary base station, where the reconfiguration message includes a random access response window size, of the secondary serving cell, that is used by the terminal to receive the random access response message. Alternatively, the reconfiguration message includes the response window size and activation time, and the terminal determines, according to the activation time, a time for receiving the random access resource allocation message.

Specifically, the terminal receives the random access response window size and the activation time sent by the primary base station, where the random access response window size is a time window at which the terminal receives the random access response message, that is, a period of time from when the terminal starts receiving the random access response message to when the terminal stops receiving the random access response message is determined. The activation time is a time at which the terminal receives the random access resource allocation message.

Figure 31:
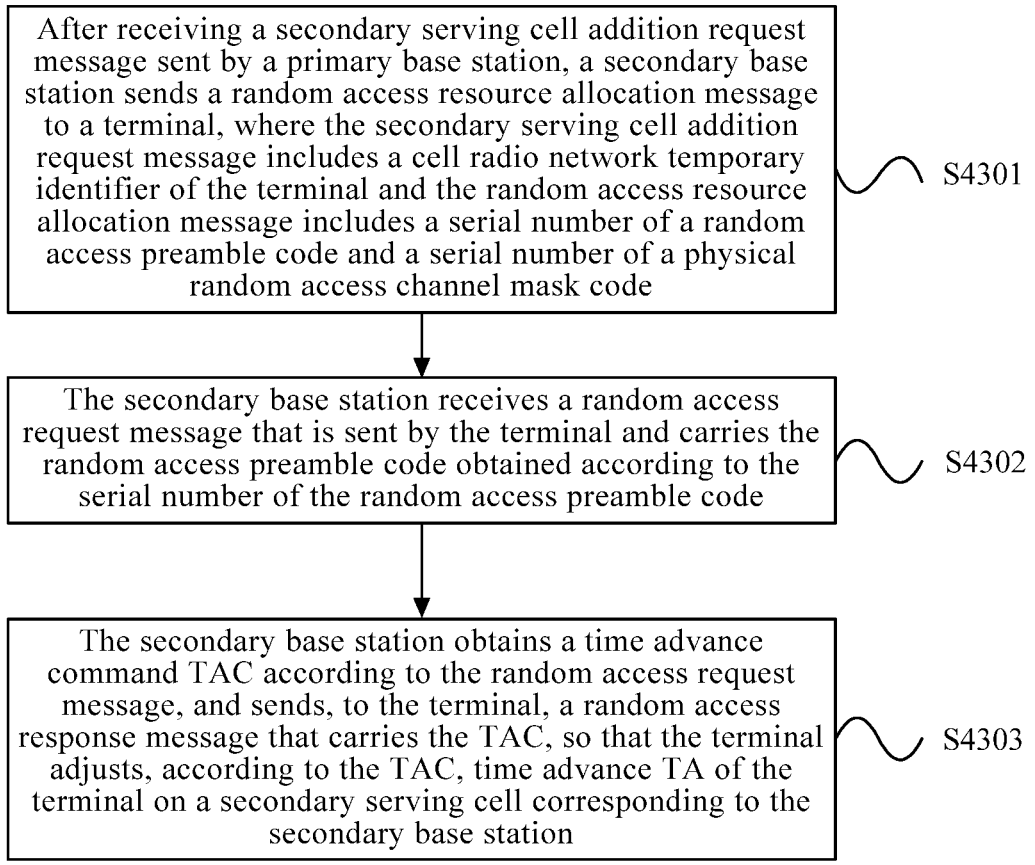
FIG. 31 is a schematic flowchart 8 of an embodiment of a method for adding a secondary serving cell according to the present invention.

FIG. 31 is a schematic flowchart 8 of an embodiment of a method for adding a secondary serving cell according to the present invention. The method applies to a secondary base station, and includes the following steps:

Step 4301: After receiving a secondary serving cell addition request message sent by a primary base station, the secondary base station sends a random access resource allocation message to a terminal, where the secondary serving cell addition request message includes a cell radio network temporary identifier of the terminal and the random access resource allocation message includes a serial number of a random access preamble code and a serial number of a physical random access channel mask code.

Specifically, after the secondary base station receives the cell radio network temporary identifier of the terminal sent by the primary base station, the secondary base station sends the serial number of the random access preamble code and the serial number of the physical random access channel mask code to the terminal, and the secondary base station uses the cell radio network temporary identifier to scramble the serial number of the random access preamble code and the serial number of the physical random access channel mask code.

Step 4302: The secondary base station receives a random access request message that is sent by the terminal and carries the random access preamble code obtained according to the serial number of the random access preamble code.

Specifically, the secondary base station receives the random access preamble code that is sent by the terminal to the secondary base station.

Step 4303: The secondary base station obtains a time advance command TAC according to the random access request message, and sends, to the terminal, a random access response message that carries the TAC, so that the terminal adjusts, according to the TAC, time advance TA of the terminal on a secondary serving cell corresponding to the secondary base station.

Specifically, the secondary base station determines, according to the received random access request message, the time advance command TAC sent to the terminal, so that the terminal adjusts, according to the TAC, the time advance TA of the terminal on the corresponding cell.

Further, according to the secondary base station in the foregoing method for adding a secondary serving cell, the secondary serving cell addition request message further includes activation time, and the secondary base station determines, according to the activation time, a time for sending the random access resource allocation message.

Specifically, the secondary serving cell addition request message that is sent by the primary base station and received by the secondary base station further includes the activation time. That is, in addition to receiving the cell radio network temporary identifier of the terminal sent by the primary base station, the secondary base station further receives the activation time, where the activation time is used by the secondary base station to determine the time for sending the random access resource allocation message.

Figure 32:
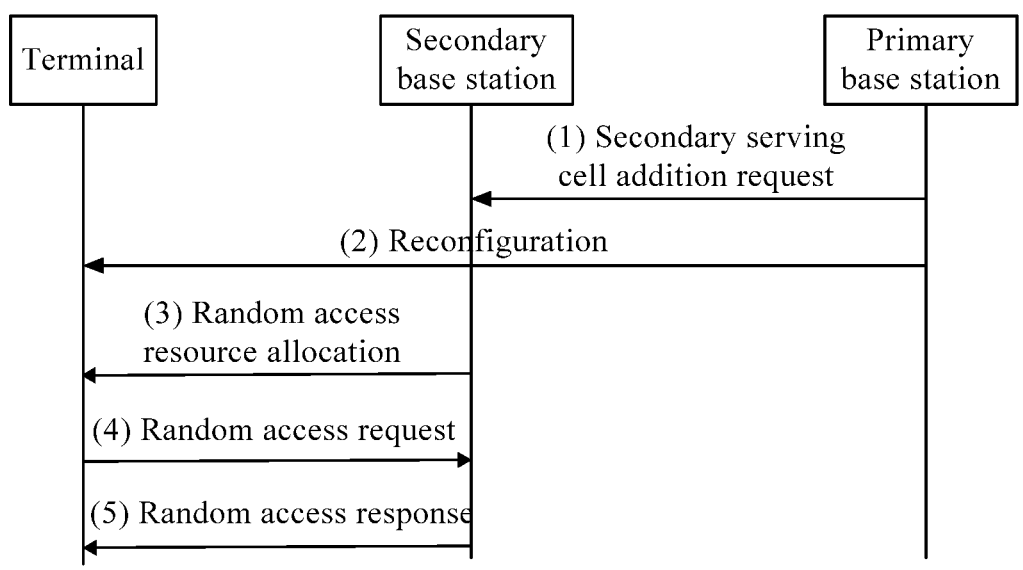
FIG. 32 is a schematic signaling diagram of a sixth embodiment of a network system according to the present invention.

FIG. 32 is a schematic signaling diagram of a sixth embodiment of a network system according to the present invention. As shown in FIG. 32, transmission of the signaling is divided into five steps. Step 1: A primary base station sends a secondary serving cell addition request message to a secondary base station, where the secondary serving cell addition request message includes a cell radio network temporary identifier of a terminal, and the secondary base station uses the cell radio network temporary identifier to scramble a random access resource allocation message, and sends a scrambled random access resource allocation message to the terminal; optionally, the secondary serving cell addition request message further includes activation time, and the secondary base station determines, according to the activation time, a time for sending the random access resource allocation message. Step 2: The primary base station sends a reconfiguration message to the terminal, where the reconfiguration message includes a response window size and the activation time, and the terminal determines, according to the response window size, a time window for receiving a random access response message so receive the random access response message, and the terminal determines, according to the received activation time, a time for receiving a random access resource allocation message to receive the random access resource allocation message. Step 3: The secondary base station sends the random access resource allocation message to the terminal, where the random access resource allocation message includes a serial number of a random access preamble code and a serial number of a PRACH mask code determined by the secondary base station. Step 4: The terminal sends a random access request message to the secondary base station according to the received random access resource allocation message, where the random access request message includes a random access preamble code. Step 5: The secondary base station sends the random access response message to the terminal according to the received random access request message, where the random access response message includes a time advance command TAC, so that the terminal adjusts, according to the TAC, time advance TA of the terminal on a corresponding cell. Step 2 is optional. When step 2 is skipped, the terminal determines, according to self-determined activation time, a time for receiving the random access resource allocation message to receive the random access resource allocation message, and determines, according to a default response window size, a time window for receiving the random access response message to receive the random access response message. In addition, before the terminal receives the random access resource allocation message, the terminal further receives the cell radio network temporary identifier of the terminal sent by the primary base station, so that the terminal uses the cell radio network temporary identifier to descramble the random access resource allocation message.

According to the method for adding a secondary serving cell, the apparatus, the device, and the network system that are provided in the embodiments of the present invention, a primary base station sends a secondary serving cell addition request message to a secondary base station, so that in a subsequent step, a terminal can correctly descramble a random access resource allocation message received by the terminal, and correctly send a random access request message to the secondary base station according to the random access resource allocation message, and the secondary base station then determines, according to the random access request message, content of a random access response message and a time for sending the message to the terminal. According to the embodiments of the present invention, a primary serving cell and a secondary serving cell can still work properly when the primary serving cell and the secondary serving cell belong to different base stations, or a delay over a connection between the primary serving cell and the secondary serving cell is relatively long and a capacity is relatively small.

Figure 33:
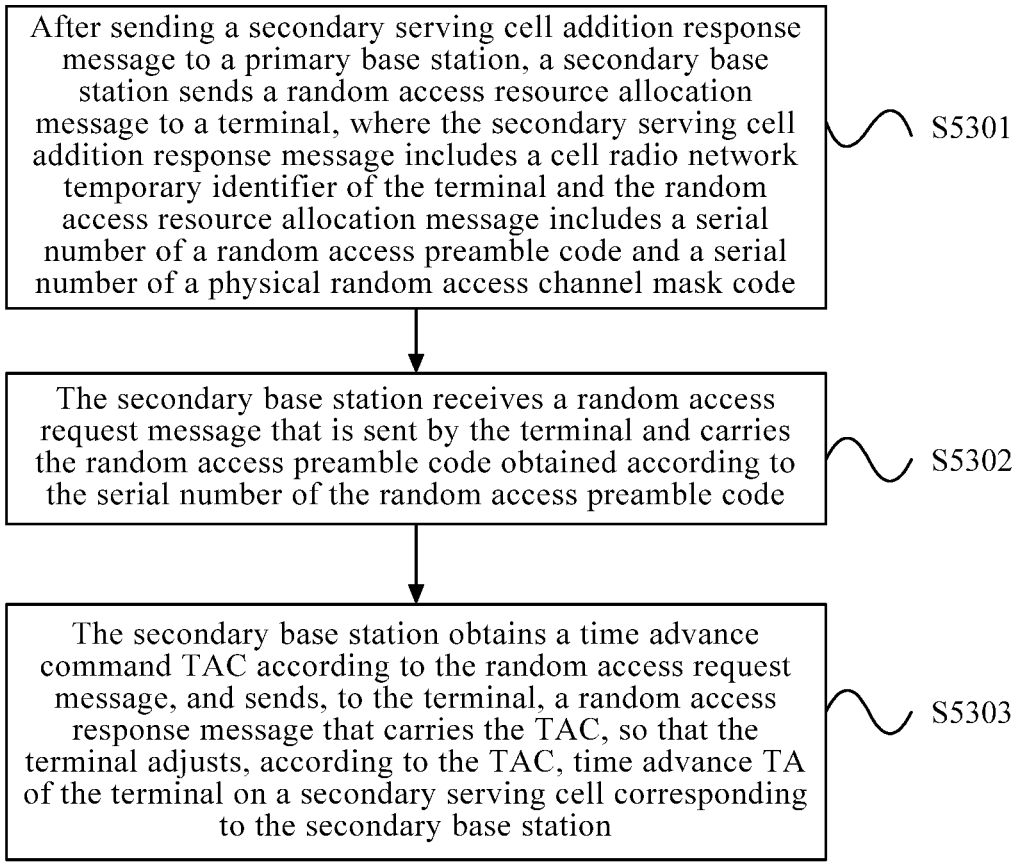
FIG. 33 is a schematic flowchart 9 of an embodiment of a method for adding a secondary serving cell according to the present invention.

FIG. 33 is a schematic flowchart 9 of an embodiment of a method for adding a secondary serving cell according to the present invention. The method applies to a secondary base station, and includes the following steps:

Step S301: After sending a secondary serving cell addition response message to a primary base station, the secondary base station sends a random access resource allocation message to a terminal, where the secondary serving cell addition response message includes a cell radio network temporary identifier of the terminal and the random access resource allocation message includes a serial number of a random access preamble code and a serial number of a physical random access channel mask code.

Specifically, after the secondary base station sends the cell radio network temporary identifier to the primary base station, the secondary base station sends the serial number of the random access preamble code and the serial number of the physical random access channel mask code to the terminal.

Step S302: The secondary base station receives a random access request message that is sent by the terminal and carries the random access preamble code obtained according to the serial number of the random access preamble code.

Specifically, the secondary base station receives the random access request message sent by the terminal to the secondary base station.

Step S303: The secondary base station obtains a time advance command TAC according to the random access request message, and sends, to the terminal, a random access response message that carries the TAC, so that the terminal adjusts, according to the TAC, time advance TA of the terminal on a secondary serving cell corresponding to the secondary base station.

Specifically, the secondary base station determines, according to the received random access request message, the time advance command TAC sent to the terminal, so that the terminal adjusts, according to the TAC, the time advance TA of the terminal on the corresponding cell.

Further, according to the secondary base station in the foregoing method for adding a secondary serving cell, the secondary serving cell addition response message further includes activation time, and the secondary base station determines, according to the activation time, a time for sending the random access resource allocation message.

Specifically, the secondary serving cell addition response message sent by the secondary base station to the primary base station further includes the activation time. That is, in addition to sending the cell radio network temporary identifier of the terminal to the primary base station, the secondary base station further sends the activation time to the primary base station, the activation time is forwarded by the primary base station to the terminal, and the activation time is used by the terminal to determine the time for receiving the random access resource allocation message.

Figure 34:
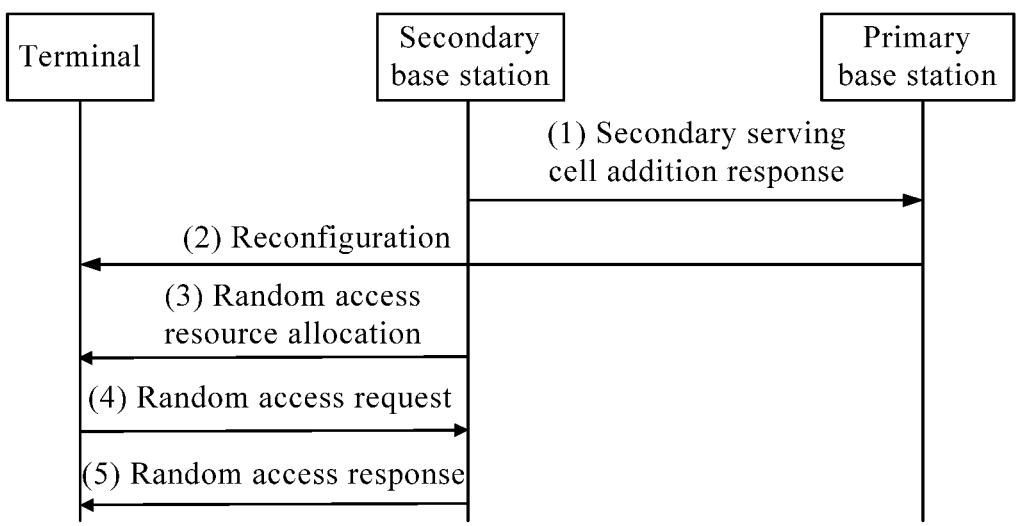
FIG. 34 is a schematic signaling diagram of a seventh embodiment of a network system according to the present invention.

FIG. 34 is a schematic signaling diagram of a seventh embodiment of a network system according to the present invention. As shown in FIG. 34, transmission of the signaling is divided into five steps. Step 1: A secondary base station sends a secondary serving cell addition response message to a primary base station, where the secondary serving cell addition response message includes a cell radio network temporary identifier of a terminal, and the secondary base station uses the cell radio network temporary identifier to scramble a random access resource allocation message, and sends a scrambled random access resource allocation message to the terminal; optionally, the secondary serving cell addition response message further includes activation time. Steps 2, 3, 4, and 5 are the same as steps 2, 3, 4, and 5 in the schematic signaling diagram of the sixth embodiment, and details are not described herein again. After the secondary base station sends the secondary serving cell addition response message to the primary base station and before the terminal receives the random access resource allocation message, the terminal further receives the cell radio network temporary identifier of the terminal sent by the primary base station, and the terminal uses the cell radio network temporary identifier to descramble the received random access resource allocation message. In this embodiment, the cell radio network temporary identifier of the terminal is determined by the secondary base station, then sent to the primary base station, and then sent by the primary base station to the terminal.

According to the method for adding a secondary serving cell, the apparatus, the device, and the network system that are provided in the embodiments of the present invention, a secondary base station sends a secondary serving cell addition response message to a primary base station, so that in a subsequent step, a terminal can correctly descramble a random access resource allocation message received by the terminal, and correctly send a random access request message to the secondary base station according to the random access resource allocation message, and the secondary base station then determines, according to the random access request message, content of a random access response message and a time for sending the message to the terminal. According to the embodiments of the present invention, a primary serving cell and a secondary serving cell can still work properly when the primary serving cell and the secondary serving cell belong to different base stations, or a delay over a connection between the primary serving cell and the secondary serving cell is relatively long and a capacity is relatively small.

Figure 35:
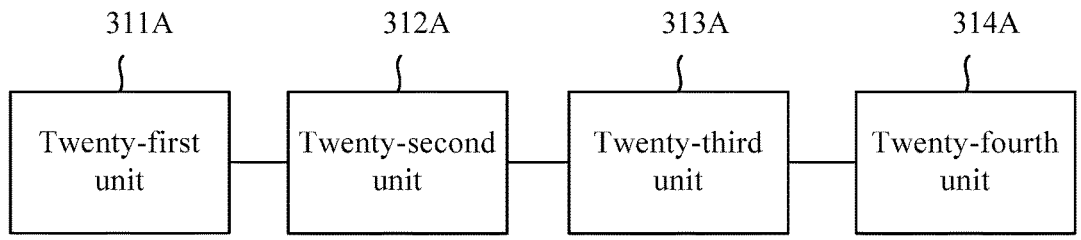
FIG. 35 is a schematic structural diagram 7 of an apparatus embodiment for adding a secondary serving cell according to the present invention.

FIG. 35 is a schematic structural diagram 7 of an apparatus embodiment for adding a secondary serving cell according to the present invention. As shown in FIG. 35, a terminal includes a twenty-first unit 311A, a twenty-second unit 312A, a twenty-third unit 313A, and a twenty-fourth unit 314A. The twenty-first unit 311A is configured to receive a random access resource allocation message sent by a secondary base station, where the random access resource allocation message includes a serial number of a random access preamble code and a serial number of a physical random access channel mask code. The twenty-second unit 312A is configured to send a random access request message to a secondary base station by using a sending resource that is determined according to the serial number of the physical random access channel mask code, where the random access request message includes the random access preamble code that is determined according to the serial number of the random access preamble code. The twenty-third unit 313A is configured to receive a random access response message sent by the secondary base station, where the random access response message includes a time advance command TAC that is determined by the secondary base station according to the random access request message. The twenty-fourth unit 314A is configured to adjust, according to the TAC, time advance TA of the terminal on a secondary serving cell corresponding to the secondary base station.

Further, according to the terminal in the foregoing apparatus for adding a secondary serving cell, the twenty-first unit 311A is further configured to receive a reconfiguration message sent by the primary base station, where the reconfiguration message includes a random access response window size, of the secondary serving cell, that is for the terminal to receive the random access response message, or the reconfiguration message includes the response window size and activation time, and the terminal determines, according to the activation time, a time for receiving the random access resource allocation message.

Further, before receiving the random access resource allocation message, the twenty-first unit 311A further receives a cell radio network temporary identifier of the terminal sent by the primary base station, and the terminal uses the cell radio network temporary identifier to descramble the received random access resource allocation message.

Figure 36:
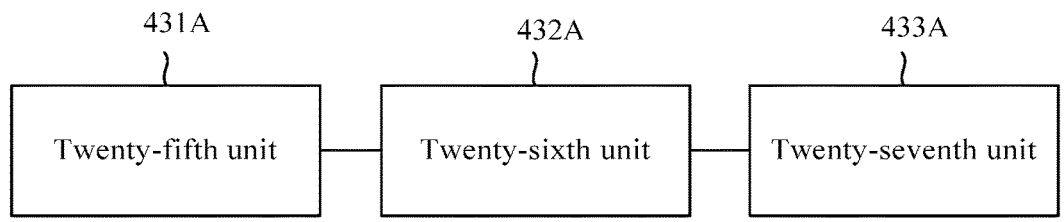
FIG. 36 is a schematic structural diagram 8 of an apparatus embodiment for adding a secondary serving cell according to the present invention.

FIG. 36 is a schematic structural diagram 8 of an apparatus embodiment for adding a secondary serving cell according to the present invention. As shown in FIG. 36, a secondary base station includes a twenty-fifth unit 431A, a twenty-sixth unit 432A, and a twenty-seventh unit 433A. The twenty-fifth unit 431A is configured to, after receiving a secondary serving cell addition request message sent by a primary base station, send a random access resource allocation message to a terminal, where the secondary serving cell addition request message includes a cell radio network temporary identifier of the terminal and the random access resource allocation message includes a serial number of a random access preamble code and a serial number of a physical random access channel mask code. The twenty-sixth unit 432A is configured to receive a random access request message that is sent by the terminal and carries the random access preamble code obtained according to the serial number of the random access preamble code. The twenty-seventh unit 433A is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition request message received by the twenty-fifth unit 431A further includes activation time, and the secondary base station determines, according to the activation time, a time for sending the random access resource allocation message.

Figure 37:
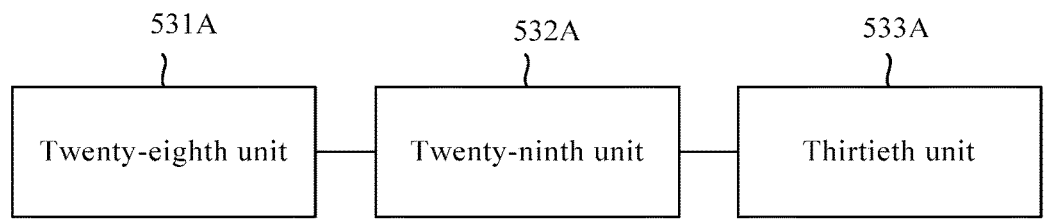
FIG. 37 is a schematic structural diagram 9 of an apparatus embodiment for adding a secondary serving cell according to the present invention.

FIG. 37 is a schematic structural diagram 9 of an apparatus embodiment for adding a secondary serving cell according to the present invention. As shown in FIG. 37, a secondary base station includes a twenty-eighth unit 531A, a twenty-ninth unit 532A, and a thirtieth unit 533A. The twenty-eighth unit 531A is configured to, after sending a secondary serving cell addition response message to a primary base station, send a random access resource allocation message to a terminal, where the secondary serving cell addition response message includes a cell radio network temporary identifier of the terminal and the random access resource allocation message includes a serial number of a random access preamble code, a serial number of a physical random access channel mask code, and the cell radio network temporary identifier of the terminal. The twenty-ninth unit 532A is configured to receive a random access request message that is sent by the terminal and carries the random access preamble code obtained according to the serial number of the random access preamble code. The thirtieth unit 533A is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

Further, the secondary serving cell addition response message sent by the twenty-eighth unit 531A further includes activation time, and the secondary base station determines, according to the activation time, a time for sending the random access resource allocation message.

Figure 38:
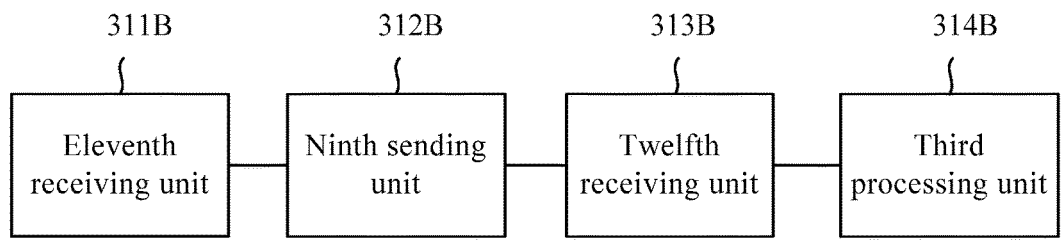
FIG. 38 is a schematic structural diagram 7 of a device embodiment for adding a secondary serving cell according to the present invention.

An embodiment of the present invention provides a terminal device. FIG. 38 is a schematic structural diagram 7 of a device embodiment for adding a secondary serving cell according to the present invention. As shown in FIG. 38, the terminal device includes an eleventh receiving unit 311B, a ninth sending unit 312B, a twelfth receiving unit 313B, and a third processing unit 314B. The eleventh receiving unit 311B is configured to receive a random access resource allocation message sent by a secondary base station, where the random access resource allocation message includes a serial number of a random access preamble code and a serial number of a physical random access channel mask code. The ninth sending unit 312B is configured to send a random access request message to a secondary base station by using a sending resource that is determined according to the serial number of the physical random access channel mask code, where the random access request message includes the random access preamble code that is determined according to the serial number of the random access preamble code. The twelfth receiving unit 313B is configured to receive a random access response message sent by the secondary base station, where the random access response message includes a time advance command TAC that is determined by the secondary base station according to the random access request message. The third processing unit 314B is configured to adjust, according to the TAC, time advance TA of the terminal on a secondary serving cell corresponding to the secondary base station.

According to the foregoing terminal device, the eleventh receiving unit 311B is further configured to receive a reconfiguration message sent by a primary base station, where the reconfiguration message includes a random access response window size, of the secondary serving cell, that is used by a terminal to receive the random access response message, or the reconfiguration message includes the response window size and activation time, and the terminal determines, according to the activation time, a time for receiving the random access resource allocation message.

According to the foregoing terminal device, the eleventh receiving unit 311B is further configured to, before receiving the random access resource allocation message, further receive a cell radio network temporary identifier of the terminal sent by a primary base station, where the terminal uses the cell radio network temporary identifier to descramble the received random access resource allocation message.

Figure 39:
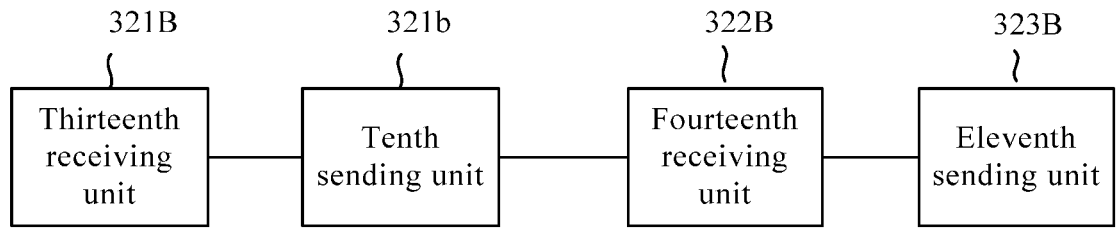
FIG. 39 is a schematic structural diagram 8 of a device embodiment for adding a secondary serving cell according to the present invention.

FIG. 39 is a schematic structural diagram 8 of a device embodiment for adding a secondary serving cell according to the present invention. As shown in FIG. 39, a secondary base station device includes a thirteenth receiving unit 321B, a tenth sending unit 321b, a fourteenth receiving unit 322B, and an eleventh sending unit 323B. The thirteenth receiving unit 321B is configured to receive a secondary serving cell addition request message sent by a primary base station. The tenth sending unit 321B is configured to, after receiving the secondary serving cell addition request message sent by the primary base station, send a random access resource allocation message to a terminal, where the secondary serving cell addition request message includes a cell radio network temporary identifier of the terminal and the random access resource allocation message includes a serial number of a random access preamble code and a serial number of a physical random access channel mask code. The fourteenth receiving unit 322B is configured to receive a random access request message that is sent by the terminal and carries the random access preamble code obtained according to the serial number of the random access preamble code. The eleventh sending unit 323B is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition request message further includes activation time, and the secondary base station determines, according to the activation time, a time for sending the random access resource allocation message.

Figure 40:
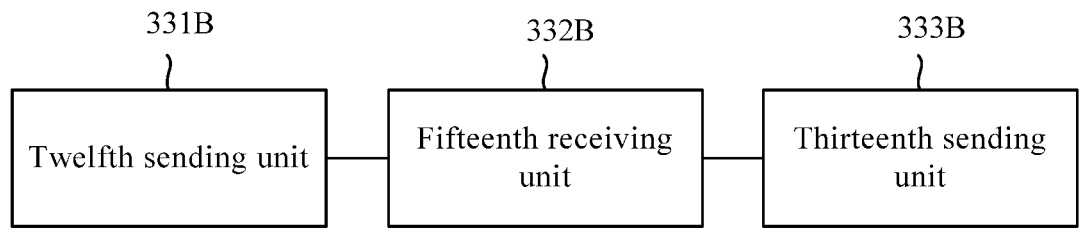
FIG. 40 is a schematic structural diagram 9 of a device embodiment for adding a secondary serving cell according to the present invention.

FIG. 40 is a schematic structural diagram 9 of a device embodiment for adding a secondary serving cell according to the present invention. As shown in FIG. 40, a secondary base station device includes a twelfth sending unit 331B, a fifteenth receiving unit 332B, and a thirteenth sending unit 333B. The twelfth sending unit 331B is configured to, after sending a secondary serving cell addition response message to a primary base station, send a random access resource allocation message to a terminal, where the secondary serving cell addition response message includes a cell radio network temporary identifier of the terminal and the random access resource allocation message includes a serial number of a random access preamble code and a serial number of a physical random access channel mask code. The fifteenth receiving unit 332B is configured to receive a random access request message that is sent by the terminal and carries the random access preamble code obtained according to the serial number of the random access preamble code. The thirteenth sending unit 333B is configured to obtain a time advance command TAC according to the random access request message, and send, to the terminal, a random access response message that carries the TAC, so that the terminal adjusts, according to the TAC, time advance TA of the terminal on a secondary serving cell corresponding to the secondary base station.

According to the foregoing secondary base station device, the secondary serving cell addition response message further includes activation time, and the secondary base station determines, according to the activation time, a time for sending the random access resource allocation message.

Figure 41:
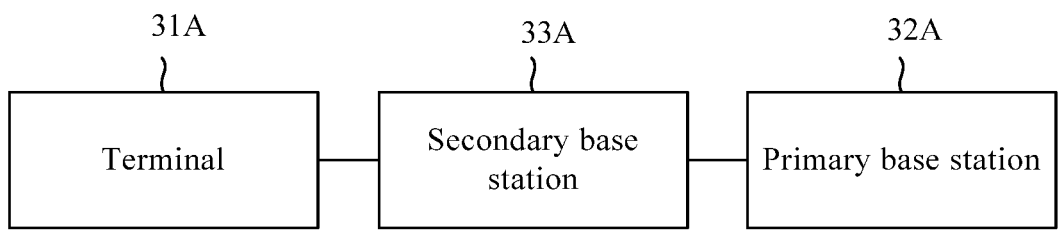
FIG. 41 is a schematic structural diagram 5 of an embodiment of a network system according to the present invention.

FIG. 41 is a schematic structural diagram 5 of an embodiment of a network system according to the present invention. As shown in FIG. 41, the network system includes a terminal 31A, a secondary base station 33A, and a primary base station 32A. The terminal 31A receives a reconfiguration message sent by the primary base station 32A, the terminal 31A receives a random access resource allocation message sent by the secondary base station 33A, and before receiving the random access resource allocation message, the terminal 31A further receives a cell radio network temporary identifier of the terminal sent by the primary base station. The terminal 31A sends a random access request message to the secondary base station 33A according to the received random access resource allocation message. The terminal 31A adjusts, according to a received random access response message, time advance TA of the terminal 31A on a corresponding cell. The secondary base station 33A sends a secondary serving cell addition response message to the primary base station 32A or receives a secondary serving cell addition request message sent by the primary base station 32A. The secondary base station 33A sends the random access resource allocation message to the terminal 31A, and the secondary base station 33A receives the random access request message sent by the terminal 31A and then sends the random access response message to the terminal 31A according to the received random access request message, so that the terminal 31A adjusts the time advance TA of the terminal 31A on the corresponding cell. The primary base station 32A receives the secondary serving cell addition response message sent by the secondary base station 33A or sends the secondary serving cell addition request message to the secondary base station 33A. Before the terminal receives the random access resource allocation message, the primary base station further sends the cell radio network temporary identifier of the terminal to the terminal. The primary base station 32A sends the reconfiguration message to the terminal 31A.

Figure 42:
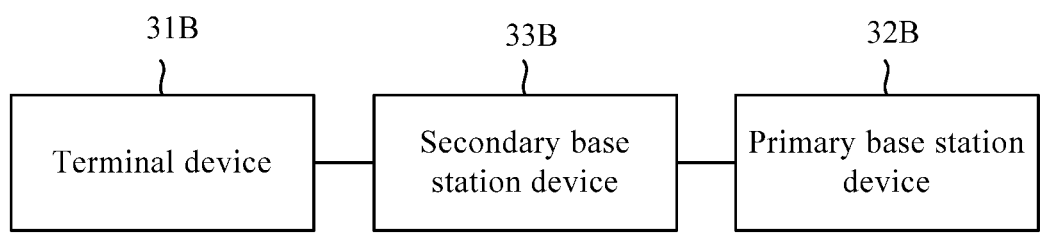
FIG. 42 is a schematic structural diagram 6 of an embodiment of a network system according to the present invention.

FIG. 42 is a schematic structural diagram 6 of an embodiment of a network system according to the present invention. As shown in FIG. 42, the network system includes a terminal device 31B, a secondary base station device 33B, and a primary base station device 32B. The devices are configured to correspondingly execute the technical solution of the apparatus embodiment shown in FIG. 41. A principle and a technical effect thereof are similar, and details are not described herein again.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A terminal, comprising:
a receiver, configured to receive a random access resource allocation message sent by a primary base station, wherein the random access resource allocation message comprises a serial number of a random access preamble code and a serial number of a physical random access channel mask code;
a transmitter, configured to send a random access request message to a secondary base station by using a sending resource determined according to the serial number of the physical random access channel mask code, wherein the random access request message comprises the random access preamble code determined according to the serial number of the random access preamble code;
wherein the receiver is further configured to receive a random access response message sent by the primary base station, wherein the random access response message comprises a time advance command (TAC) sent by the secondary base station to the primary base station and determined by the secondary base station according to the random access request message; and
a processor, configured to adjust, according to the TAC, time advance (TA) of the terminal on a secondary serving cell corresponding to the secondary base station.

2. A primary base station, comprising:
a transmitter, configured to send a random access resource allocation message and a secondary serving cell addition request message to a terminal and a secondary base station, respectively, wherein both the random access resource allocation message and the secondary serving cell addition request message comprise a serial number of a random access preamble code and a serial number of a physical random access channel mask code;
a receiver, configured to receive a time advance command (TAC) transmission message sent by the secondary base station, wherein the TAC transmission message is sent to the primary base station after the secondary base station receives a random access request message that is sent by the terminal and carries the random access preamble code obtained according to the serial number of the random access preamble code; wherein the TAC transmission message comprises a TAC obtained by the secondary base station according to the random access request message; and
wherein the transmitter is further configured to send a random access response message comprising the TAC to the terminal for adjusting, according to the TAC, time advance (TA) of the terminal on a secondary serving cell corresponding to the secondary base station.

3. The primary base station according to claim 2, wherein:
the time advance command (TAC) transmission message further comprises a first time at which the secondary base station receives the random access request message; and
correspondingly, the transmitter is further configured to determine, according to the first time, a second time for sending the random access response message.

4. A secondary base station, comprising:
a receiver, configured to:
receive a secondary serving cell addition request message sent by a primary base station, wherein the secondary serving cell addition request message comprises a serial number of a random access preamble code and a serial number of a physical random access channel mask code, and
receive, according to the secondary serving cell addition request message, a random access request message sent by a terminal and comprising a random access preamble code; and
a processor, configured to obtain a time advance command (TAC) according to the random access request message, and send, to the primary base station, a time advance command (TAC) transmission message comprising the TAC, so that the primary base station sends, to the terminal, a random access response message that carries the TAC, so that the terminal adjusts, according to the TAC, time advance TA of the terminal on a secondary serving cell corresponding to the secondary base station.

5. The secondary base station according to claim 4, wherein the time advance command (TAC) transmission message further comprises a first time at which the secondary base station receives the random access request message, so that the primary base station determines, according to the first time, a second time for sending the random access response message.

* * * * *